(12) United States Patent
Igarashi

(10) Patent No.: US 8,179,550 B2
(45) Date of Patent: May 15, 2012

(54) MANAGEMENT APPARATUS FOR TRANSMITTING DATA TO A VIRTUAL DEVICE AND METHOD

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 12/194,931

(22) Filed: Aug. 20, 2008

(65) Prior Publication Data
US 2009/0051963 A1 Feb. 26, 2009

(30) Foreign Application Priority Data

Aug. 24, 2007 (JP) ................................ 2007-218640

(51) Int. Cl.
*G06F 3/12* (2006.01)
*G06F 15/173* (2006.01)
(52) U.S. Cl. ...... 358/1.15; 358/1.1; 358/1.13; 358/1.14; 709/217; 709/220; 709/223; 709/228; 709/238; 709/242; 719/324; 703/26; 703/27
(58) Field of Classification Search ............ 358/1.1, 358/1.14, 1.15, 1.13; 709/217, 219, 228, 709/238, 223, 220, 242; 719/324; 713/100; 703/26, 27
See application file for complete search history.

(56) References Cited

U.S. PATENT DOCUMENTS

| | | | | |
|---|---|---|---|---|
| 5,450,571 A | * | 9/1995 | Rosekrans et al. | 703/24 |
| 5,884,075 A | * | 3/1999 | Hester et al. | 713/100 |
| 5,978,559 A | * | 11/1999 | Quinion | 358/1.15 |
| 6,369,907 B1 | * | 4/2002 | Aoki | 358/1.15 |
| 6,552,813 B2 | * | 4/2003 | Yacoub | 358/1.1 |
| 7,003,723 B1 | * | 2/2006 | Kremer et al. | 715/234 |
| 7,158,248 B2 | * | 1/2007 | Smith et al. | 358/1.15 |
| 7,392,172 B2 | * | 6/2008 | Rostampour | 703/26 |
| 7,788,364 B2 | * | 8/2010 | Horiyama | 709/223 |
| 7,948,643 B2 | * | 5/2011 | Aritomi | 358/1.13 |
| 8,028,175 B2 | * | 9/2011 | Diab et al. | 713/300 |
| 8,031,353 B2 | * | 10/2011 | Miyata | 358/1.15 |
| 2003/0212783 A1 | | 11/2003 | Sakai | |
| 2007/0177178 A1 | * | 8/2007 | Miyata | 358/1.13 |

FOREIGN PATENT DOCUMENTS

| | | |
|---|---|---|
| JP | 2003-323364 | 11/2003 |
| JP | 2004-005697 A | 1/2004 |
| JP | 2006-163463 | 6/2006 |
| JP | 2006-163463 A | 6/2006 |

* cited by examiner

*Primary Examiner* — Twyler Haskins
*Assistant Examiner* — Dennis Dicker
(74) *Attorney, Agent, or Firm* — Canon USA, Inc., IP Division

(57) ABSTRACT

A management apparatus includes a management unit configured to manage information associating each of a plurality of image processing apparatuses constituting a virtual device with a function executed by the each of the plurality of image processing apparatuses, a control unit configured to provide a display for setting a virtual device as a transmission destination of transmission data, an identification unit configured, if a virtual device is set as the transmission destination of the transmission data, to identify an image processing apparatus that executes a function corresponding to a type of the transmission data from among the plurality of image processing apparatuses constituting the set virtual device based on the information managed by the management unit, and a transmission unit configured to transmit the transmission data to the image processing apparatus identified by the identification unit.

13 Claims, 20 Drawing Sheets

| ITEM NAME | FUNCTION | | | |
|---|---|---|---|---|
| | SCAN (521) | PRINT (522) | FAX (523) | RENDERING (524) |
| Virtual1 (501) | SCANNER | MFP | FAX | FAX |
| Virtual2 (502) | COPYING MACHINE | FAX | FAX | MFP |
| MFP (503) | MFP | MFP | MFP | MFP |

| | | | | |
|---|---|---|---|---|
| 610 | DATA ID | 0001 | | |
| 620 | TYPE | ADDRESS BOOK | | |
| 630 | NAME | ADDRESS BOOK 1 | | |
| 640 | CONTENT | ITEM NAME | TELEPHONE NUMBER | ... |
| | | ITEM VALUE | 03-xxx-xxxx | ... |
| 650 | INFORMATION ABOUT USER WHO GENERATED DATA | User1 | | |
| 660 | DATA GENERATION DATE AND TIME | PM 3:00, JANUARY 1, 2XXX | | |

| NAME OF USER-SELECTED ITEM | IMAGE PROCESSING APPARATUS NAME AFTER DIVISION | EXECUTING FUNCTION |
|---|---|---|
| Virtual1 | SCANNER | SCAN |
| | MFP | PRINT |
| | FAX | RENDERING |
| Virtual2 | COPYING MACHINE | SCAN |
| | FAX | PRINT AND FAX |
| | MFP | RENDERING |
| FAX | FAX | SCAN, PRINT, FAX, AND RENDERING |
| MFP | MFP | SCAN, PRINT, FAX, AND RENDERING |

FIG.10

| TRANSMISSION DATA TYPE | FUNCTION EXECUTED ON TRANSMISSION DATA |
|---|---|
| ADDRESS BOOK | SCAN, FAX |
| PAPER INFORMATION | PRINT |
| FONT | RENDERING |
| PRINT FUNCTION FIRMWARE | PRINT |

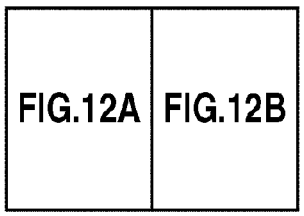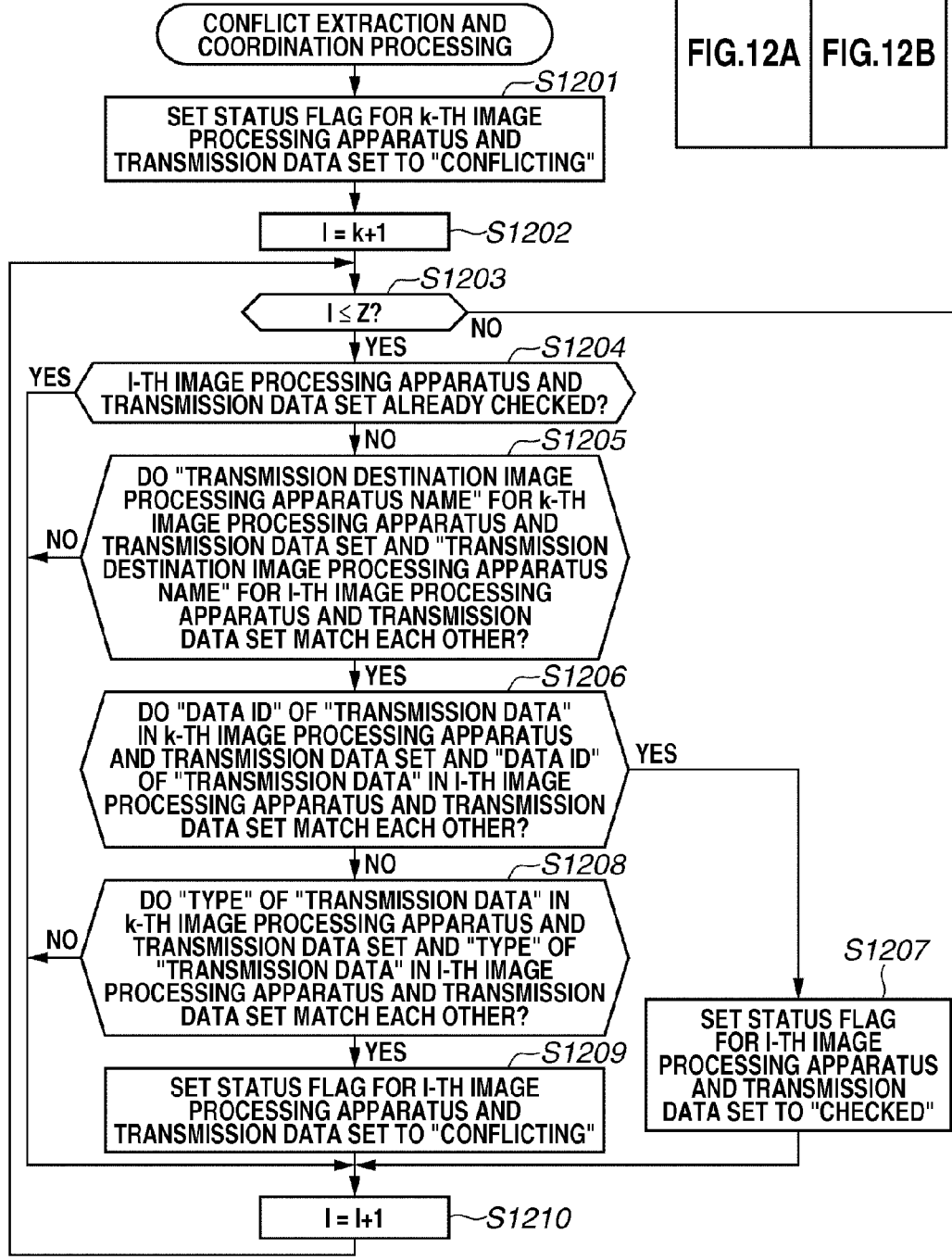

| 1410 | 1420 |
|---|---|
| DATA TYPE | CONFLICT COORDINATION METHOD |
| ADDRESS BOOK | TRANSMIT TO MUTUALLY DIFFERENT STORAGE AREAS |
| PAPER INFORMATION | MERGE BEFORE TRANSMISSION |
| FONT | DO NOT COORDINATE |
| PRINT FUNCTION FIRMWARE | USER SELECTS AND TRANSMITS ONE DATA |

1401 → (Address Book row)
1402 → (Paper Information row)
1403 → (Font row)
1404 → (Print Function Firmware row)

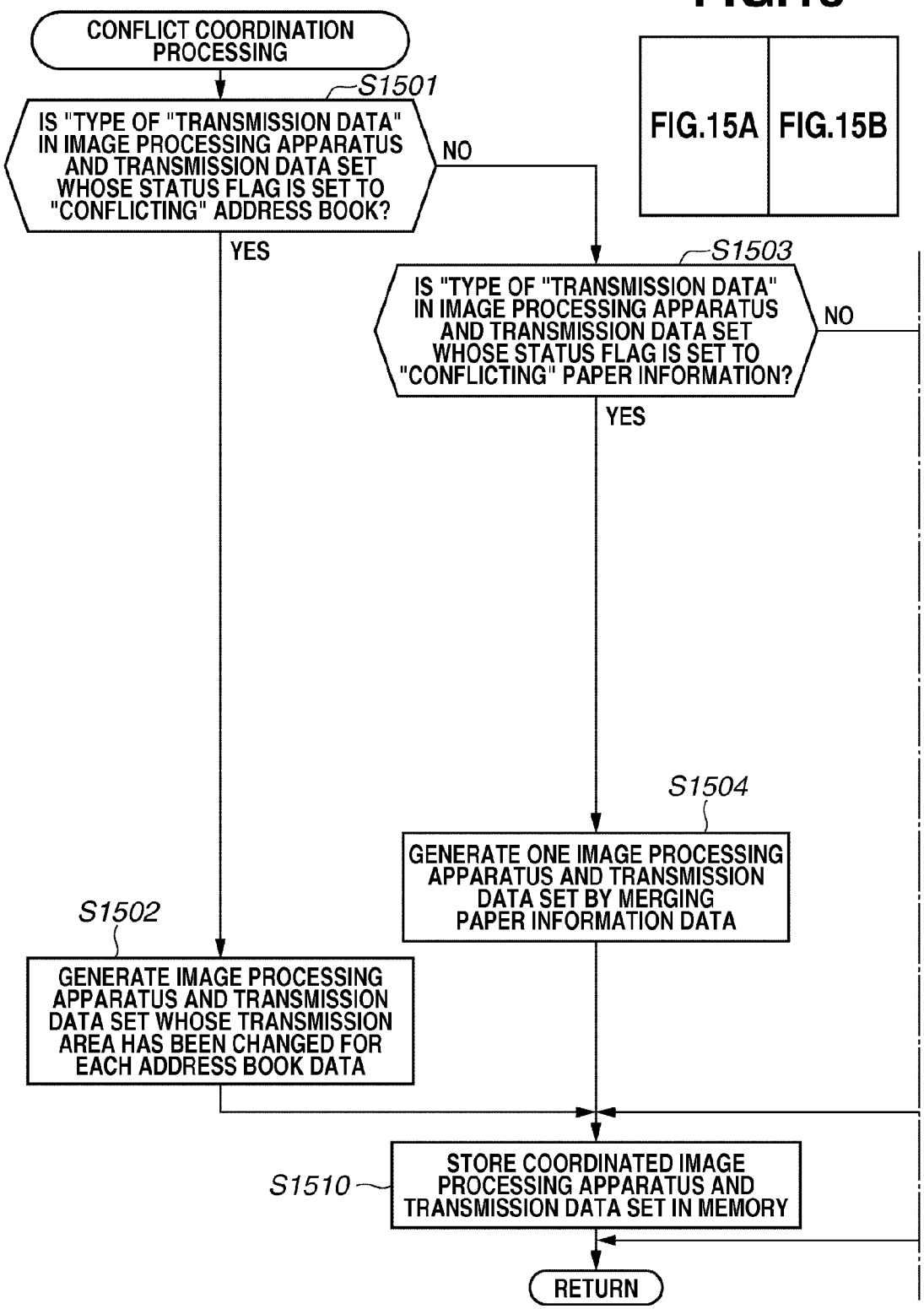

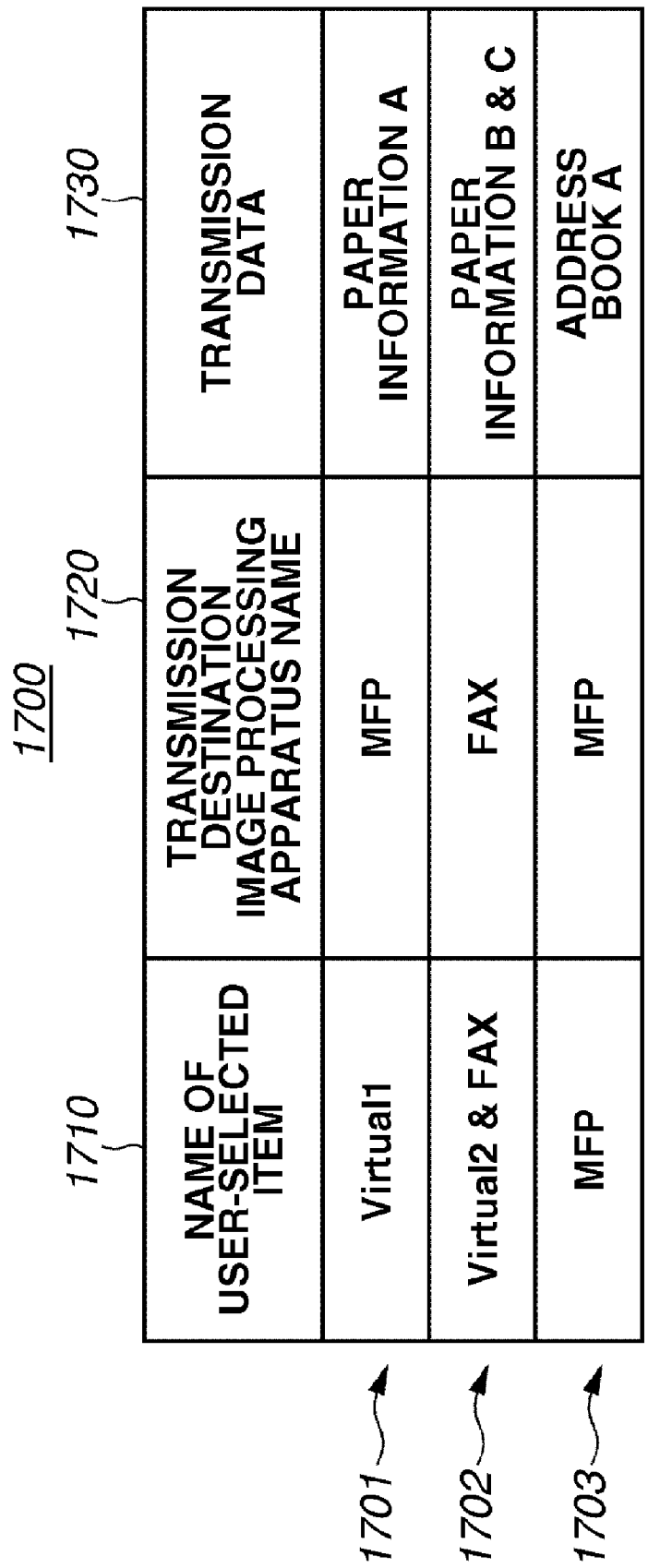

| 1810 | TASK ID | 0001 |
|---|---|---|
| 1820 | TASK NAME | SETTING ON IMAGE PROCESSING APPARATUS |
| 1830 | IMAGE PROCESSING APPARATUS AND TRANSMISSION DATA SET | COMPONENT OF COORDINATED IMAGE PROCESSING APPARATUS AND TRANSMISSION DATA TABLE |
| | | COMPONENT OF COORDINATED IMAGE PROCESSING APPARATUS AND TRANSMISSION DATA TABLE |
| | | COMPONENT OF COORDINATED IMAGE PROCESSING APPARATUS AND TRANSMISSION DATA TABLE |
| 1840 | NAME OF PERSON WHO GENERATED TASK | User1 |
| 1850 | TASK SCHEDULE | PM 3:00, JANUARY 1, 2XXX |

MANAGEMENT APPARATUS FOR TRANSMITTING DATA TO A VIRTUAL DEVICE AND METHOD

BACKGROUND OF THE INVENTION

1. Field of the Invention

The present invention relates to a management apparatus, an information processing method, and a storage medium. More particularly, the present invention relates to a method for transmitting various types of data to image processing apparatuses.

2. Description of the Related Art

A conventional management apparatus transmits various data at once by one transmission operation to a plurality of apparatuses (image processing apparatuses such as multifunction peripherals (MFPs), copying machines, or printers) constituting an apparatus group (see Japanese Patent Application Laid-Open No. 2003-323364). According to Japanese Patent Application Laid-Open No. 2003-323364, a user of a management apparatus can form a group of image processing apparatuses with a simple operation by setting the number of image processing apparatuses that can be registered with the group and conditions therefor. Furthermore, by transmitting various data to the apparatus group, the load on the user can be reduced.

Moreover, Japanese Patent Application Laid-Open No. 2006-163463 discusses a method for building a virtual printer system including a plurality of image processing apparatuses. In the method discussed in Japanese Patent Application Laid-Open No. 2006-163463, a user inputs a print job to the built-up virtual printer system.

After analyzing a characteristic of the print job, the virtual printer system determines an image processing apparatus that actually performs printing from among image processing apparatuses in the virtual printer system. Thus, the user is aware of the virtual printer system only. That is, in this case, it becomes unnecessary for the user to know which image processing apparatus performs the instructed printing.

However, the management apparatus discussed in Japanese Patent Application Laid-Open No. 2006-163463 transmits the same data to all image processing apparatuses in the apparatus group formed by the user.

That is, in the case where a plurality of image processing apparatuses having different functions is grouped as one image processing apparatus, it is useful to transmit data only to the desired image processing apparatus. However, the management apparatus discussed in Japanese Patent Application Laid-Open No. 2006-163463 cannot perform this processing.

Furthermore, in the system discussed in Japanese Patent Application Laid-Open No. 2006-163463, in the case where a plurality of data on which similar processing is performed by the same image processing apparatus exists, the transmission of either of the plurality of data may become disabled depending on the configuration of the virtual printer system.

SUMMARY OF THE INVENTION

The present invention provides for selecting an image processing apparatus that is most appropriate for transmitting transmission data from among a plurality of image processing apparatuses and transmitting the data to the selected image processing apparatus. Furthermore, the present invention provides for appropriately transmitting data even if a plurality of data to be processed with the same processing by the same image processing apparatus exists.

According to an aspect of the present invention, a management apparatus configured to manage a plurality of image processing apparatuses that are in communication with each other includes a management unit configured to, in order to provide processing performed by a virtual device to a user by cooperatively operating a plurality of image processing apparatuses constituting the virtual device, manage information associating each of the plurality of image processing apparatuses constituting the virtual device with a function executed by the each of the plurality of image processing apparatuses, a control unit configured to provide a display for setting a virtual device as a transmission destination of transmission data, an identification unit configured to, if a virtual device is set as the transmission destination of the transmission data, identify an image processing apparatus that executes a function corresponding to a type of the transmission data from among the plurality of image processing apparatuses constituting the set virtual device based on the information managed by the management unit, and a transmission unit configured to transmit the transmission data to the image processing apparatus identified by the identification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 illustrates an example of an item table according to an exemplary embodiment of the present invention.

FIG. 6 illustrates an exemplary structure of transmission data according to an exemplary embodiment of the present invention.

FIG. 9 illustrates an example of an item division table according to an exemplary embodiment of the present invention.

FIG. 10 illustrates an example of a data transmission condition table according to an exemplary embodiment of the present invention.

FIG. 14 illustrates an example of a data conflict coordination table according to an exemplary embodiment of the present invention.

FIG. 17 illustrates an example of a coordinated device and transmission data table according to an exemplary embodiment of the present invention.

FIG. 18 illustrates an exemplary configuration of a data transmission task according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

According to the present exemplary embodiment, a management apparatus transmits data to one or more virtual devices. Here, a "virtual device" refers to, for example, a group of image processing apparatuses that includes a combination of a plurality of image processing apparatuses that are connected to a network. The plurality of image processing apparatuses is regarded virtually as one image processing apparatus.

The virtual device provides a user with various types of processing by executing functions of a plurality of image processing apparatuses operating in combination and cooperation with one another. With respect to the processing provided by the virtual device, the virtual device can provide copy processing to the user, for example, performed by scanning an image of an original document with an image processing apparatus in the virtual device and printing the scanned image on another image processing apparatus. Furthermore, the virtual device can provide, to a user, FAX processing of the scanned data by transmitting the scanned data using a facsimile transmission function of another image processing apparatus in the virtual device.

Figure 1:
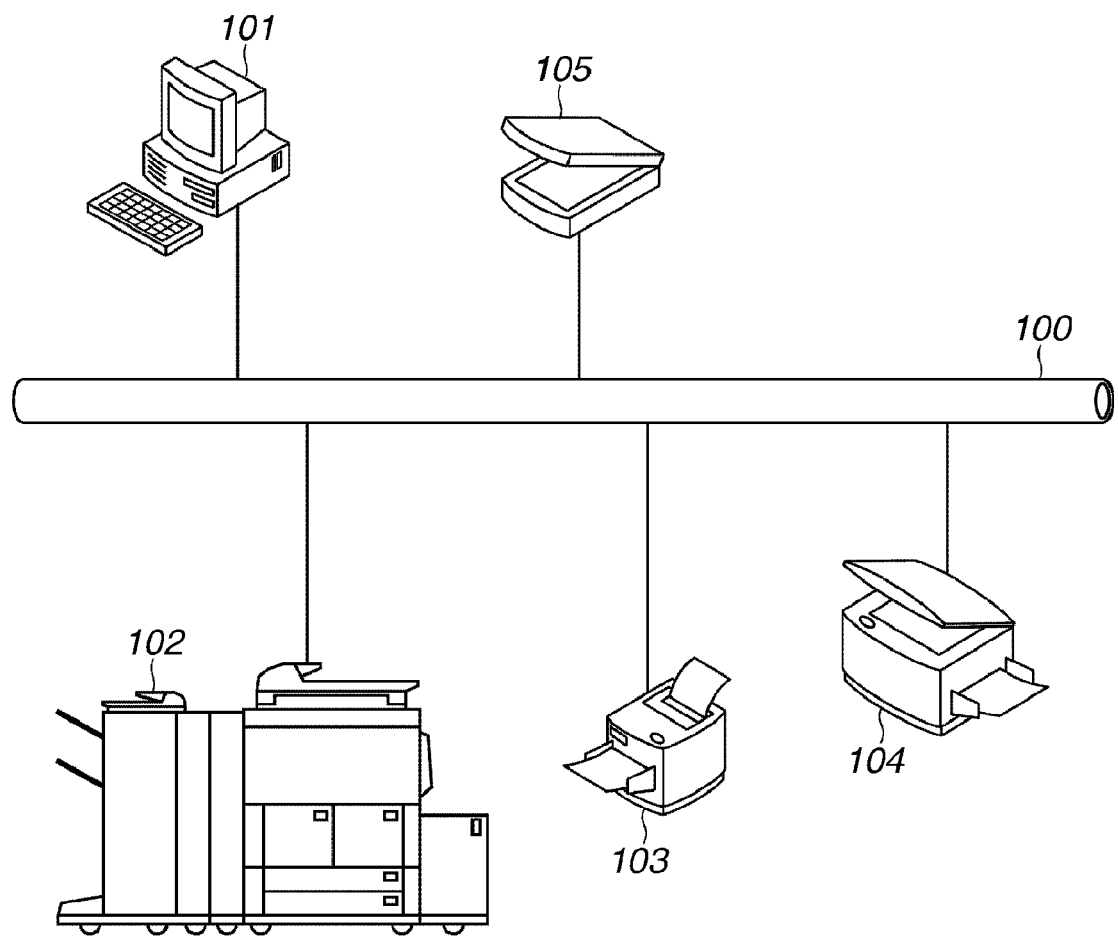
FIG. 1 illustrates an exemplary configuration of a data transmission system in which a management apparatus according to an exemplary embodiment of the present invention operates.

FIG. 1 illustrates an exemplary configuration of a data transmission system in which the management apparatus operates according to the present exemplary embodiment. Referring to FIG. 1, a management apparatus 101, an MFP 102, a FAX apparatus 103 having a printing function, a copying machine 104 having a scanner function, and a scanner 105 are in communication with one another via a local area network (LAN) 100.

In the present exemplary embodiment, each of the MFP 102, the FAX apparatus 103, the copying machine 104, and the scanner 105 corresponds to an image processing apparatus. However, each of the MFP 102, the FAX apparatus 103, the copying machine 104, and the scanner 105 is a mere example of an image processing apparatus, and the present exemplary embodiment is not limited to these. For example, in the data transmission system illustrated in FIG. 1, a digital copying machine, a printer having a copy function, or a printer having a single function can be used in substitution for the MFP 102.

Figure 2:
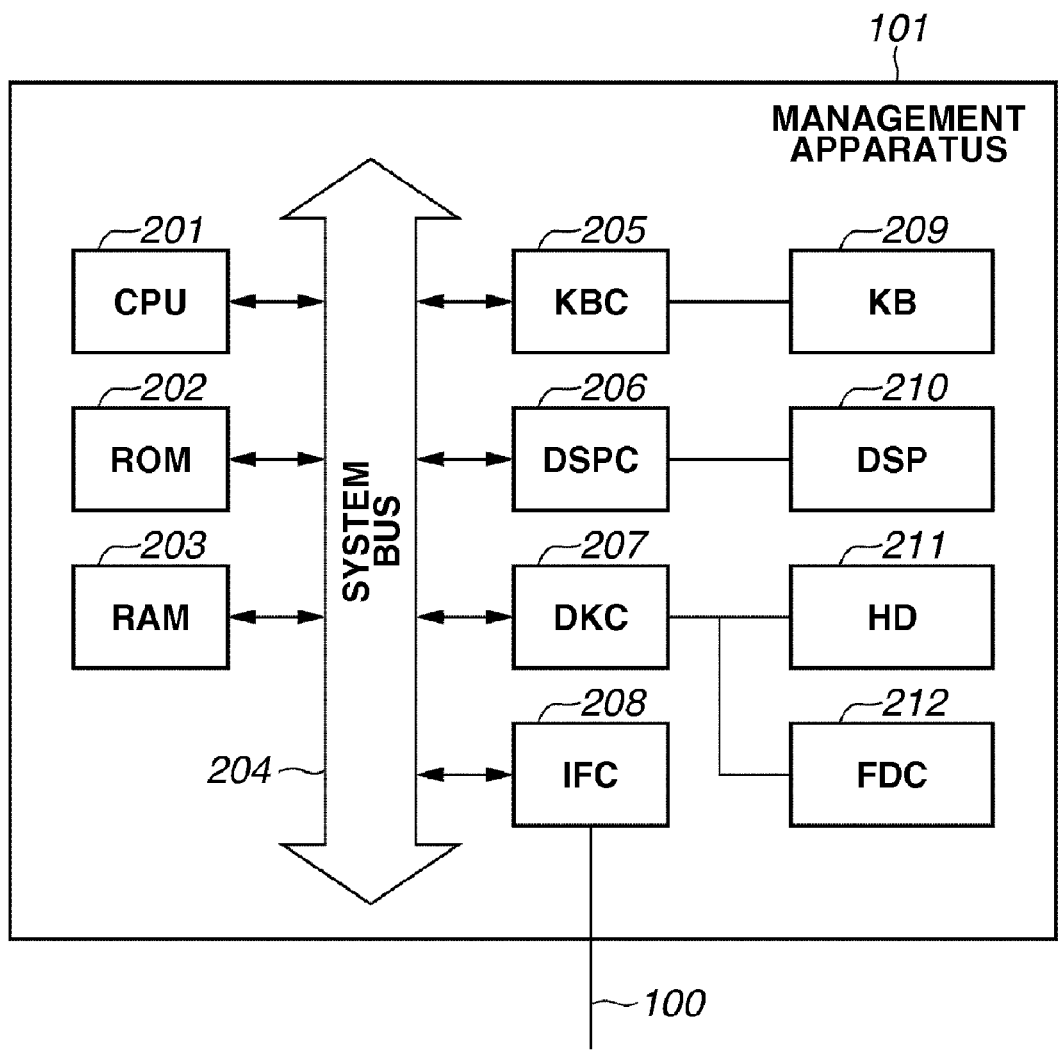
FIG. 2 illustrates an example of a hardware configuration of the management apparatus according to an exemplary embodiment of the present invention.

FIG. 2 illustrates an example of a hardware configuration of the management apparatus 101 according to the present exemplary embodiment. The management apparatus 101 is implemented by a personal computer (PC), for example.

Referring to FIG. 2, a read-only memory (ROM) 202 and a hard disk drive (HD) 211 store a software program for managing an image processing apparatus. Here, the image processing apparatus management software program performs operations of the management apparatus 101, which will be described below. In the description about the operation of the management apparatus 101, a central processing unit (CPU) 201 of the management apparatus 101 performs processing on hardware of the management apparatus 101 unless otherwise noted herein. The image processing apparatus management software stored in the HD 211 executes control on software of the management apparatus 101 unless otherwise noted herein.

A random access memory (RAM) 203 functions as a main memory or a work area for the CPU 201. A keyboard controller (KBC) 205 controls a user instruction and a user input via a keyboard (KB) 209 or a pointing device (not illustrated) such as a mouse.

A display controller (DSPC) 206 controls display by a display (DSP) unit 210. A disk controller (DKC) 207 controls access to a storage device, such as a compact disc-read only memory (CD-ROM) drive (not illustrated), and the HD 211, and a floppy disk controller (FDC) 212. The above-described units are connected to one another via a system bus 204.

The HD 211 stores a boot program, an operating system (OS), image processing apparatus management software, and data processed thereby. An interface controller (IFC) 208 performs data communication with other network-connected apparatuses via the LAN 100. Here, in the present exemplary embodiment, Microsoft® Windows® is used as the OS. However, the OS is not limited to this and any other appropriate operating system can be used.

Here, the program of the image processing apparatus management software can be supplied as a storage medium, such as a floppy disk or a CD-ROM storing the same. In this case, the program is read by a floppy disk controller (FDC) 212 or a CD-ROM drive (not illustrated) from the storage medium and is installed on the HD 211.

Figure 3:
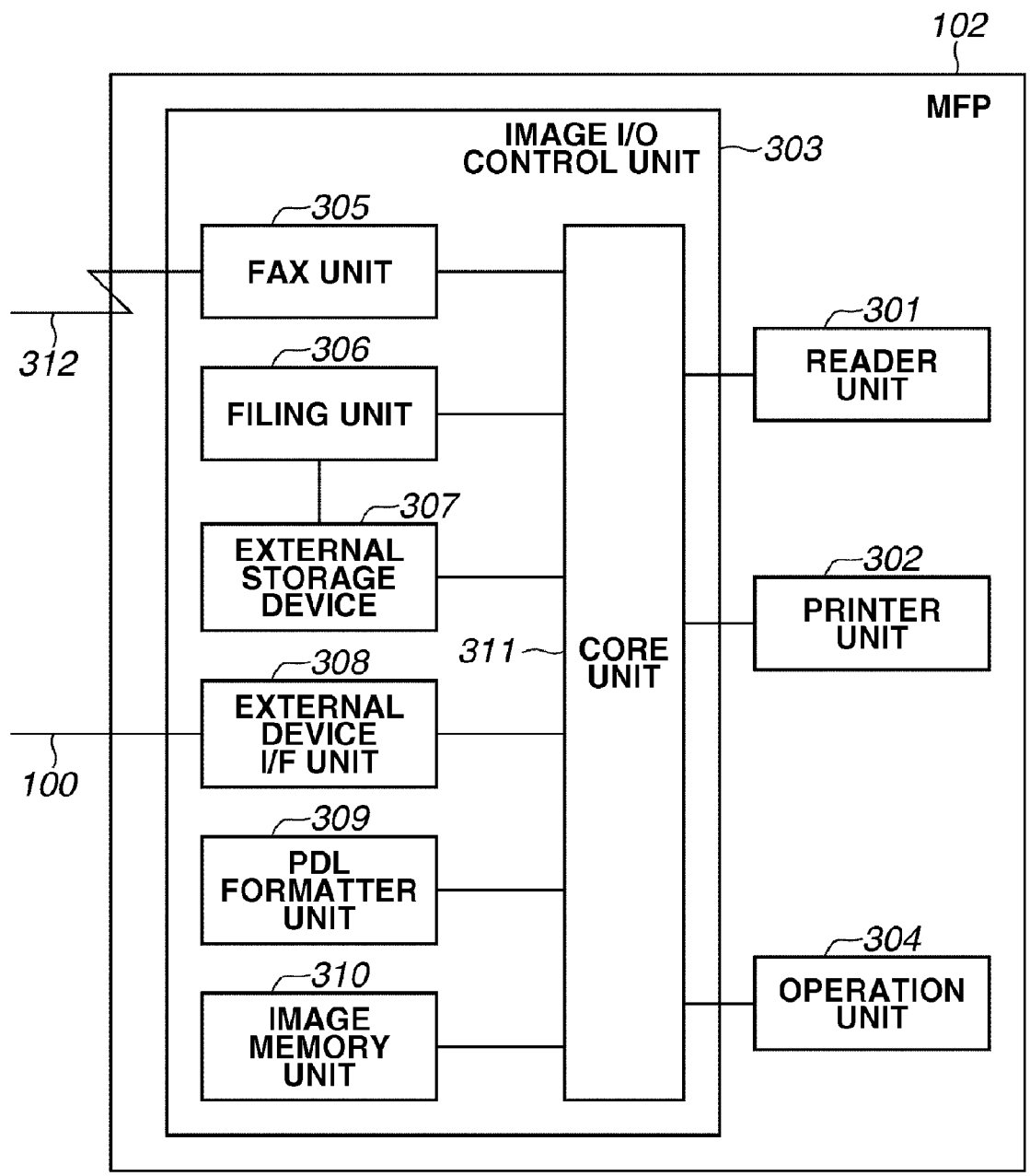
FIG. 3 illustrates an example of a hardware configuration of an MFP according to an exemplary embodiment of the present invention.

FIG. 3 illustrates an example of a hardware configuration of the MFP 102 according to the present exemplary embodiment. Since the FAX apparatus 103, the copying machine 104, and the scanner 105 each include and can be implemented with a part of a configuration illustrated in FIG. 3, a detailed description for these apparatuses will be omitted herein.

Referring to FIG. 3, the MFP 102 includes a scanner function, a printer function, a copy function, and a facsimile transmission function as a single multifunction peripheral. The MFP 102 is connected to other communication apparatuses via a public line network 312. The MFP 102 primarily includes a reader unit 301, a printer unit 302, an image input and output (I/O) control unit 303, and an operation unit 304.

The reader unit 301 implements the scan function. More specifically, the reader unit 301, which is connected to the image I/O control unit 303, reads an image of an original document according to a user instruction performed via the operation unit 304 and outputs the read data of the image (image data) to the image I/O control unit 303.

The printer unit 302 implements the printing function. More specifically, the printer unit 302, which is connected to the image I/O control unit 303, prints image data output from the image I/O control unit 303 on a recording medium.

The image I/O control unit 303, which is connected to a local area network (LAN) 100 or a public telephone line network 312, inputs and outputs image data, analyzes a job, and performs control for performing a job. Furthermore, the image I/O control unit 303 implements the rendering function.

The image I/O control unit 303 includes a facsimile (FAX) unit 305, a filing unit 306, an external storage device unit 307, an external device I/F unit 308, a page description language (PDL) formatter unit 309, an image memory unit 310, and a core unit 311. The operation unit 304 receives a user input and a user operation.

The facsimile unit 305 is connected to the core unit 311 and the public telephone line network 312. The facsimile unit 305 decompresses compressed image data received via the public telephone line network 312 and sends the decompressed image data to the core unit 311. Furthermore, the facsimile unit 305 compresses image data transmitted from the core unit 311 and sends the compressed image data via the public telephone line network 312.

The filing unit 306 is connected to the core unit 311 and the external storage device 307. The filing unit 306 stores image data sent from the core unit 311 and a result of executing a device control command on the external storage device 307 together with a keyword for searching for the image data or the device control command execution result. The external storage device 307 is, for example, a hard disk drive. Furthermore, the filing unit 306 reads the image data and a result of executing a device control command stored on the external storage device 307 based on the keyword sent from the core unit 311 and sends the read image data or control command execution result to the core unit 311.

The external I/F unit 308 is connected to the LAN 100. The external I/F unit 308 functions as an interface between other network-connected apparatuses and the core unit 311.

Sending and receiving of job control data, image data, and a device control command performed with other network-connected apparatuses, is performed via the external I/F unit 308.

The job control data includes a job control command sent together with PDL data. A job control command includes, for example, a command for rasterizing PDL data, printing the rasterized image data, stapling, sorting, and then discharging a recording medium having the image data printed thereon. Furthermore, a device control command includes a data sending and receiving command for receiving various data related to a setting for the MFP 102 and instructing storing the received data within the MFP 102.

The PDL formatter unit 309 is connected to the core unit 311. The PDL formatter unit 309 rasterizes PDL data included in a job sent from the host computer (the management apparatus 101) into image data printable with the printer unit 302.

The image memory unit 310 temporarily stores information sent from the reader unit 301 and information sent from the host computer (the management apparatus 101) via the external I/F unit 308. The core unit 311 controls the flow of data that is sent and received among the components of the MFP 102, namely, the reader unit 301, the printer unit 302, the operation unit 304, the facsimile unit 305, the filing unit 306, the external storage device 307, the external I/F unit 308, the PDL formatter unit 309, and the image memory unit 310.

Figure 4:
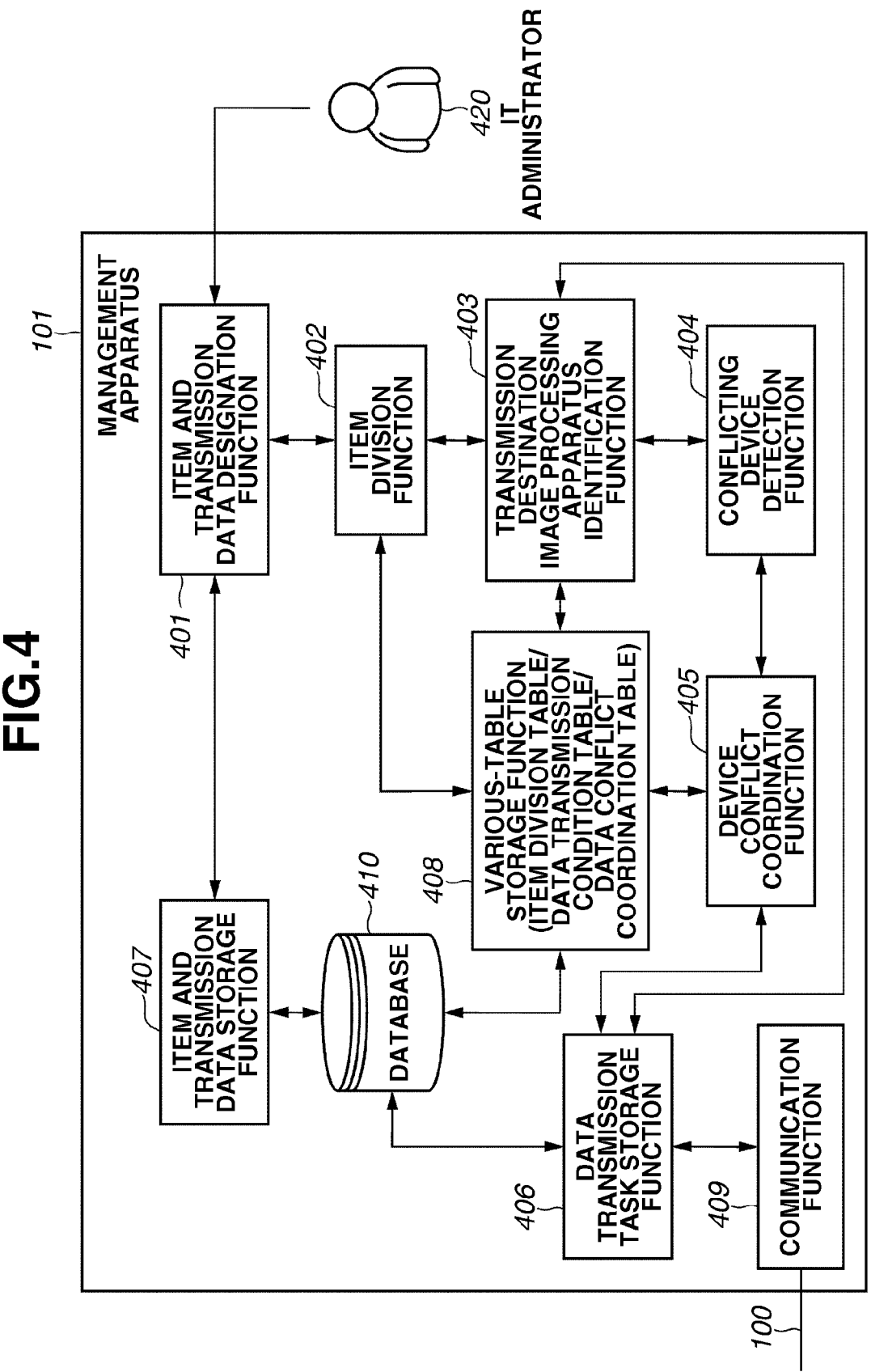
FIG. 4 illustrates an exemplary functional configuration of the management apparatus according to an exemplary embodiment of the present invention.

FIG. 4 illustrates an example of a functional configuration of the management apparatus 101 according to the present exemplary embodiment. The management apparatus 101 controls issuing of a data transmission command according to the types of a virtual device and an image processing apparatus. Hereinbelow, a virtual device and an image processing apparatus are collectively referred to as an "item".

The management apparatus 101 includes an item and transmission data designation function module 401. The item and transmission data designation function module 401 designates an item and transmission data according to an operation by an information technology (IT) administrator (user) 420. Furthermore, in designating an item or transmission data, the management apparatus 101 acquires information from an item and transmission data storage function module 407.

An item designated by the item and transmission data designation function module 401 is divided by an item division function module 402 into one or more image processing apparatuses. In dividing an item designated by the item and transmission data designation function module 401, the item division function module 402 utilizes an item division table stored on a various-table storage function module 408.

A transmission destination image processing apparatus identification function module 403 designates a destination of transmission data from among the one or more image processing apparatuses divided by the item division function module 402. In identifying a transmission destination of transmission data, the transmission destination image processing apparatus identification function module 403 utilizes a data transmission condition table stored on the various-table storage function module 408.

After an image processing apparatus that is a transmission destination of the transmission data is identified by the transmission destination image processing apparatus identification function module 403, a conflicting device detection function module 404 determines whether a plurality of different transmission data of the same type is transmitted to the image processing apparatus identified as the transmission destination. The conflicting device detection function module 404 detects the image processing apparatus to which a plurality of different transmission data of the same type is transmitted as a conflicting image processing apparatus.

A device conflict coordination function module 405 coordinates transmission data to be transmitted to the conflicting image processing apparatus detected by the conflicting device detection function module 404. In coordinating the transmission data, the device conflict coordination function module 405 utilizes a data conflict coordination table stored on the various-table storage function module 408.

A data transmission task storage function module 406 generates a data transmission task based on a list table (coordinated image processing apparatus and transmission data table) including a list of image processing apparatuses having been coordinated by the device conflict coordination function module 405 and a list of transmission data. Furthermore, the data transmission task storage function module 406 stores the generated data transmission task in a database 410. The data transmission task will be described below with reference to FIG. 18.

The item and transmission data storage function module 407 operates in cooperation with the database 410 to store and manage an item and transmission data. The various-table storage function module 408 also operates in cooperation with the database 410 to manage the item division table, the data transmission condition table, and the data conflict coordination table stored therein.

A communication function module 409 sends the data transmission task stored in the data transmission task storage function module 406 to the LAN 100. The database 410 stores various information generated by the management apparatus 101.

Now, an exemplary configuration of an item stored by the item and transmission data storage function module 407 is described below.

FIG. 5 illustrates an example of an item table according to the present exemplary embodiment. Referring to FIG. 5, the item and transmission data storage function module 407 manages each of items enumerated in an item table 500. The item table 500 is stored in the database 410.

As illustrated in FIG. 5, an item name 510 and a function 520 are associated with each other and registered in the item table 500. In the example illustrated in FIG. 5, exemplary items "Virtual1" and "Virtual2" and one MFP are registered in the item name field 510.

The items Virtual1 and Virtual2 are virtual devices each of which is constituted by a plurality of image processing apparatuses virtually regarded as one image processing apparatus. Functions of each item are enumerated in the function field 520. In the present exemplary embodiment, a scan function 521, a printing function 522, a FAX transmission function 523, and a rendering function 524 are described as examples of the functions of each item.

However, the function 520 is not limited to these. That is, for example, a PDF generation function and a box storage function are other examples of functions that can be registered in the item table 500 as the function 520. As described above, in the example illustrated in FIG. 5, the contents of entries 501 through 503 are not limited to those illustrated in FIG. 5.

Now, an exemplary structure of transmission data stored by the item and transmission data storage function module 407 is described.

FIG. 6 illustrates an exemplary structure of the transmission data according to the present exemplary embodiment.

Referring to FIG. 6, transmission data 600 includes data identification (ID) 610, data type 620, data name 630, data content 640, data generator user information 650, and data generation date and time 660. In the data ID portion 610, an ID for identifying the transmission data 600 is stored. Here, with respect to the type of value of the data ID 610, any type of value with which the transmission data 600 can be uniquely identified can be used.

In the data type portion 620, the type of the transmission data 600 is stored. In the example illustrated in FIG. 6, an "address book", for example, is stored in the data type portion 620. However, the content stored in the data type field 620 is not limited to this. That is, for example, the data type portion 620 can include "paper information", "font", or "print function firmware".

In the data name portion 630, a name of the transmission data 600 is stored. The data name portion 630 can be set by either a user or the management apparatus 101.

In the data content portion 640, content of the transmission data 600 is stored. In the example illustrated in FIG. 6, the data content portion 640 includes an item name 641 and an item value 642. In most cases, the data content portion 640 includes a plurality of items. Therefore, a plurality of item names 641 and a plurality of item values 642 are generally enumerated in the data content portion 640.

In the data generator user information portion 650, information about the user who generated the transmission data 600 is stored. Any type of information can be used for the data generator user information 650 as long as the user can be uniquely identified therewith. In addition, the data generation date and time portion 660 includes a date and time of generation of the transmission data 600.

Hereinbelow, it is supposed that the items, such as the "Virtual1", the "Virtual2", and the MFP, have been previously generated by the management apparatus 101. Furthermore, it is supposed that the item table 500 and the transmission data 600 have been previously generated by the management apparatus 101. That is, these items, the item table 500, and the transmission data 600 have been previously stored in the database 410.

Figure 7:
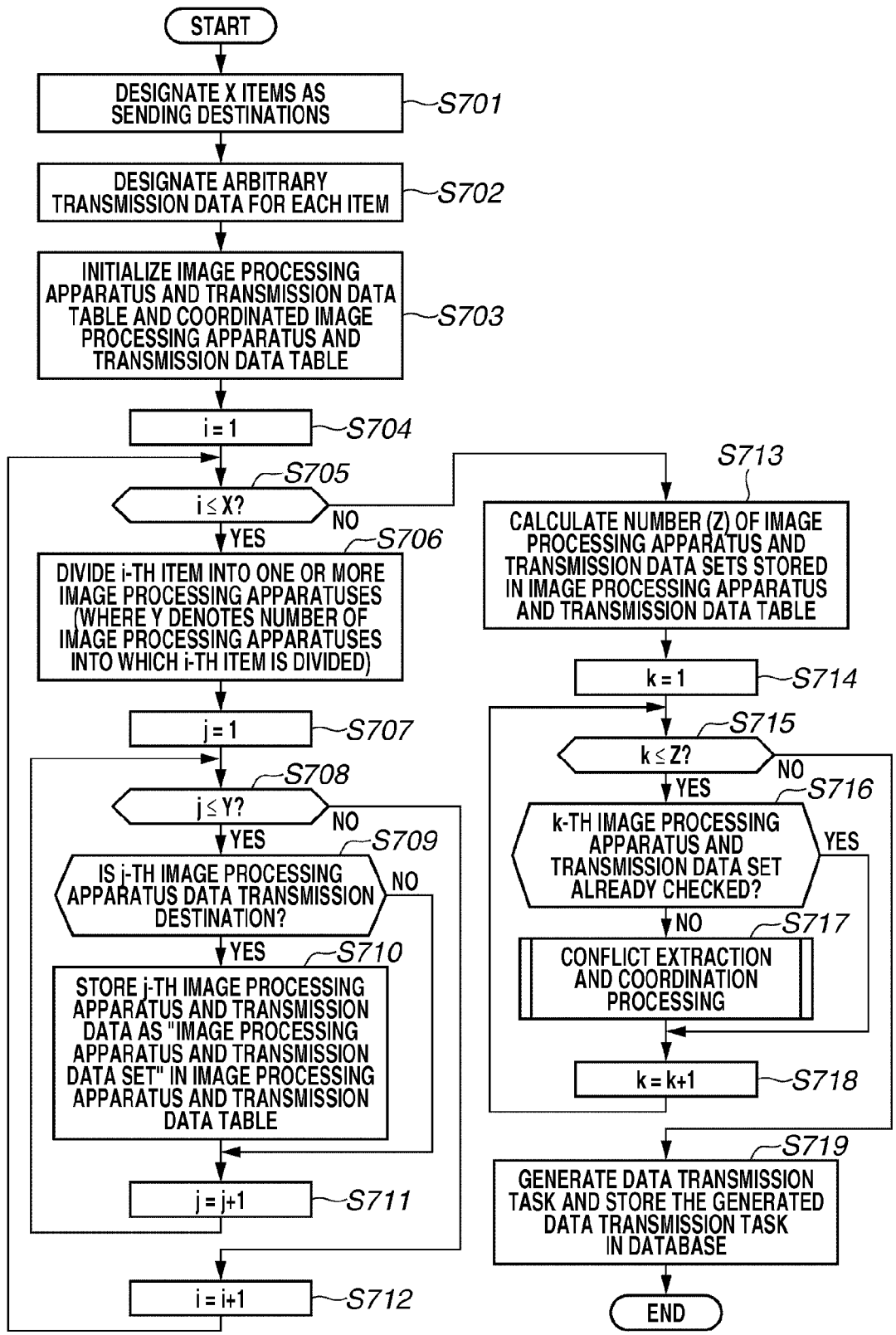
FIG. 7 is a flow chart illustrating an example of an operation performed by the management apparatus for transmitting data according to an exemplary embodiment of the present invention.

In transmitting data to a plurality of virtual devices or image processing apparatuses, the management apparatus 101 performs processing of the flow chart illustrated in FIG. 7.

Referring to FIG. 7, in step S701, the item and transmission data designation function module 401 designates an item according to an operation of the user (the IT administrator 420) of the management apparatus 101. Here, it is supposed that the IT administrator 420 has designated X (X is a natural number) items.

In step S702, the item and transmission data designation function module 401 designates arbitrary transmission data for each item designated in step S701 according to the operation of the user (IT administrator 420).

Figure 8:
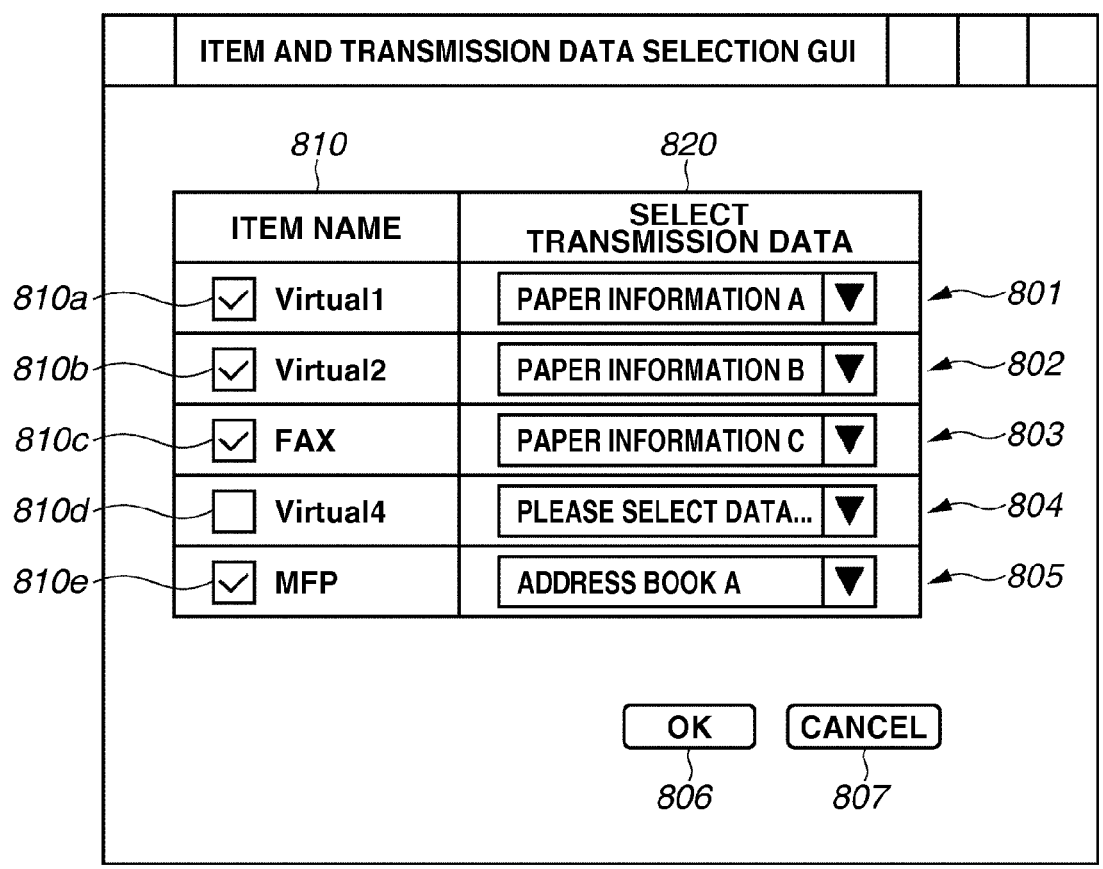
FIG. 8 illustrates an example of an item and transmission data selection screen (graphical user interface (GUI)) according to an exemplary embodiment of the present invention.

FIG. 8 illustrates an example of an item and transmission data selection screen (graphic user interface (GUI)), via which the user (the IT administrator 420) performs the processing in steps S701 and S702 of FIG. 7 according to the present exemplary embodiment.

Referring to FIG. 8, an item name 810, a transmission data selection control 820, an OK button 806, and a cancel button 807 are displayed on the item and transmission data selection screen 800.

In the item name field 810, the names of the items managed by the management apparatus 101 are displayed as a list. Furthermore, in each column of the item name field 810, check boxes 810a through 810e are located. Check boxes 810a through 810e can be marked by the user (the IT administrator 420) to identify whether each item is a destination of data transmission. That is, the item for which each of the check boxes 810a through 810e is checked is the data transmission destination item.

The transmission data selection control 820 has a function for allocating the transmission data to be transmitted to each of the items enumerated in the item name field 810. The IT administrator 420 selects one desired data as the transmission data from among the data displayed in a pull-down menu field illustrated in FIG. 8.

In the item and transmission data selection screen 800 illustrated in FIG. 8, five combinations of the item and the transmission data, namely, item and transmission data combinations 801 through 805, are displayed. However, the number of the combinations of the item and transmission data is not limited to five.

In addition, the OK button 806 can be operated by the user (the IT administrator 420) to enter the input performed via the item and transmission data selection screen 800. Furthermore, the cancel button 807 can be operated by the user (the IT administrator 420) to cancel the input entered via the item and transmission data selection screen 800. The user can select and set a virtual device via the item and transmission data selection screen 800.

With the exemplary configuration illustrated in FIG. 8, in the case where a virtual device is provided to each user, the present exemplary embodiment enables the user (the IT administrator 420) to transmit transmission data, such as resource information, without considering which image processing apparatus constituting the virtual device executes which function.

Referring back to FIG. 7, in step S703, the item division function module 402 initializes the image processing apparatus and transmission data table and the coordinated image processing apparatus and transmission data table. The image processing apparatus and transmission data table and the coordinated image processing apparatus and transmission data table will be described below. In step S704, the item division function module 402 initializes a variable i with a value "1".

In step S705, the transmission destination image processing apparatus identification function module 403 determines whether the value of the variable i is less than or equal to the number of items X.

If it is determined in step S705 that the value of the variable i is greater than X (NO in step S705), then the transmission destination image processing apparatus identification function module 403 determines that the processing in steps S706 through S712 has been performed for all of the items designated in step S701, and accordingly, the processing advances to step S713. On the other hand, if it is determined in step S705 that the value of the variable i is less than or equal to X (YES in step S705), then the processing advances to step S706.

In step S706, the item division function module 402 divides an i-th item, of the items designated in step S701, into a plurality of image processing apparatuses. Here, "Y" ("Y" is a natural number) denotes the number of image processing apparatuses divided with respect to the i-th item. The item table 500 (FIG. 5) is used for dividing each item into image processing apparatuses.

For example, in the case where the user has selected the item "Virtual1" for the item name 810 via the item and transmission data selection screen 800, the item "Virtual1" is divided into the scanner 105, which implements the scan function, the MFP 102, which implements the printing function, and the FAX apparatus 103, which implements the rendering function, as illustrated in FIG. 5.

FIG. 9 illustrates an example of an item division table generated by performing the processing in step S706 (FIG. 7) according to the present exemplary embodiment.

Referring to FIG. 9, an item division table 900 is stored in the database 410 via the various-table storage function module 408. A user-selected item name 910, an after-division image processing apparatus name 920, and an executing function 930 are associated with one another and registered in the item division table 900.

In the after-division image processing apparatus name column 920, the image processing apparatus divided by using the item table 500 is stored. In the executing function column 930, a function (processing) that an individual image processing apparatus stored in the after-division image processing apparatus name column 920 executes is stored.

In the present exemplary embodiment, either of or a combination of the scan function, the printing function, the facsimile transmission function, or the rendering function is stored in the executing function column 930. In the example illustrated in FIG. 9, the contents of entries 901 through 904 are not limited to those illustrated in FIG. 9.

Referring back to FIG. 7, in step S707, the transmission destination image processing apparatus identification function module 403 initializes a variable j with a value "1".

In step S708, the transmission destination image processing apparatus identification function module 403 compares the value of the variable j with Y to determine whether the value of the variable j is less than or equal to Y.

If it is determined in step S708 that the value of the variable j is greater than Y (NO in step S708), then the transmission destination image processing apparatus identification function module 403 determines that the processing in steps S709 through S711 has been performed on all of the divided image processing apparatuses, and accordingly, the transmission destination image processing apparatus identification function module 403 skips the processing in steps S709 through S711 and advances to step S712. On the other hand, if it is determined in step S708 that the value of the variable j is less than or equal to Y (YES in step S708), then the processing advances to step S709.

In step S709, the transmission destination image processing apparatus identification function module 403 determines whether the j-th image processing apparatus, of the image processing apparatuses divided in step S706, is a transmission destination of the transmission data designated in step S702.

If it is determined in step S709 that the j-th image processing apparatus is not a transmission destination the transmission data designated in step S702 (NO in step S709), then the transmission destination image processing apparatus identification function module 403 determines that it is not necessary to perform the processing in step S710, and accordingly, the transmission destination image processing apparatus identification function module 403 skips the processing in step S710 and advances to step S711. On the other hand, if it is determined in step S709 that the j-th image processing apparatus is a transmission destination of the transmission data designated in step S702 (YES in step S709), then the processing advances to step S710.

The determination in step S709 is performed using a data transmission condition table illustrated in FIG. 10.

Referring to FIG. 10, a data transmission condition table 1000 is stored in the database 410 and is managed by the various-table storage function module 408. A transmission data type 1010 and a function to be executed on transmission data 1020 are associated with each other and registered in the data transmission condition table 1000.

In the transmission data type column 1010, the type of data that can be transmitted by the management apparatus 101 is stored.

In the function to be executed on transmission data column 1020, processing (function) to be performed on the data registered in the transmission data type column 1010 is stored. The function stored in the function to be executed on transmission data column 1020 is selected from the function 520 in the item table 500 (FIG. 5).

In the example illustrated in FIG. 10, the contents of entries 1001 through 1004 are not limited to those illustrated in FIG. 10. For example, firmware that executes other functions can be registered in the transmission data type column 1010 instead of or in addition to the print function firmware.

Now, a specific example of the determination processing in step S709 (FIG. 7) is described. Here, the determination processing performed on the item and transmission data combination 801 displayed on the item and transmission data selection screen 800 is described as an example.

In the example illustrated in FIG. 8, in the item and transmission data combination 801, the item name is set to "Virtual1" and the transmission data is "paper information A".

Before the processing in step S709 is performed, namely, in step S706, the item division table 900 (FIG. 9) has been generated with respect to the item and transmission data combination 801.

In the item and transmission data combination 801, the transmission data is "paper information A", as described above.

Here, in the function to be executed on transmission data column 1020 corresponding to a paper information row 1002 (FIG. 10), the function "printing" is registered. Therefore, in this case, the image processing apparatus that executes the function "printing", of the executing functions 930 corresponding to the entry "Virtual1" 901 in the item division table 900, is the transmission destination image processing apparatus. That is, image processing apparatuses other than this image processing apparatus are not transmission destination image processing apparatuses in this case.

The transmission destination image processing apparatus identification function module 403 performs the following processing, for example, in step S907.

First, the transmission destination image processing apparatus identification function module 403 reads the executing functions 930 corresponding to the entry "Virtual1" 901 in the item division table 900, namely, the functions "scan", "printing", and "rendering". Then, the transmission destination image processing apparatus identification function module 403 selects the function "printing", which is the function to be executed on transmission data 1020 corresponding to the "paper information" in the data transmission condition table 1000.

Then, the transmission destination image processing apparatus identification function module 403 reads an image processing apparatus corresponding to (that executes) the selected function "printing" from the item division table 900.

Referring back to FIG. 7, in step S710, the transmission destination image processing apparatus identification function module 403 forms a combination of the i-th item name, the j-th image processing apparatus, and the transmission data, and registers the combination in the image processing apparatus and transmission data table.

Figure 11:
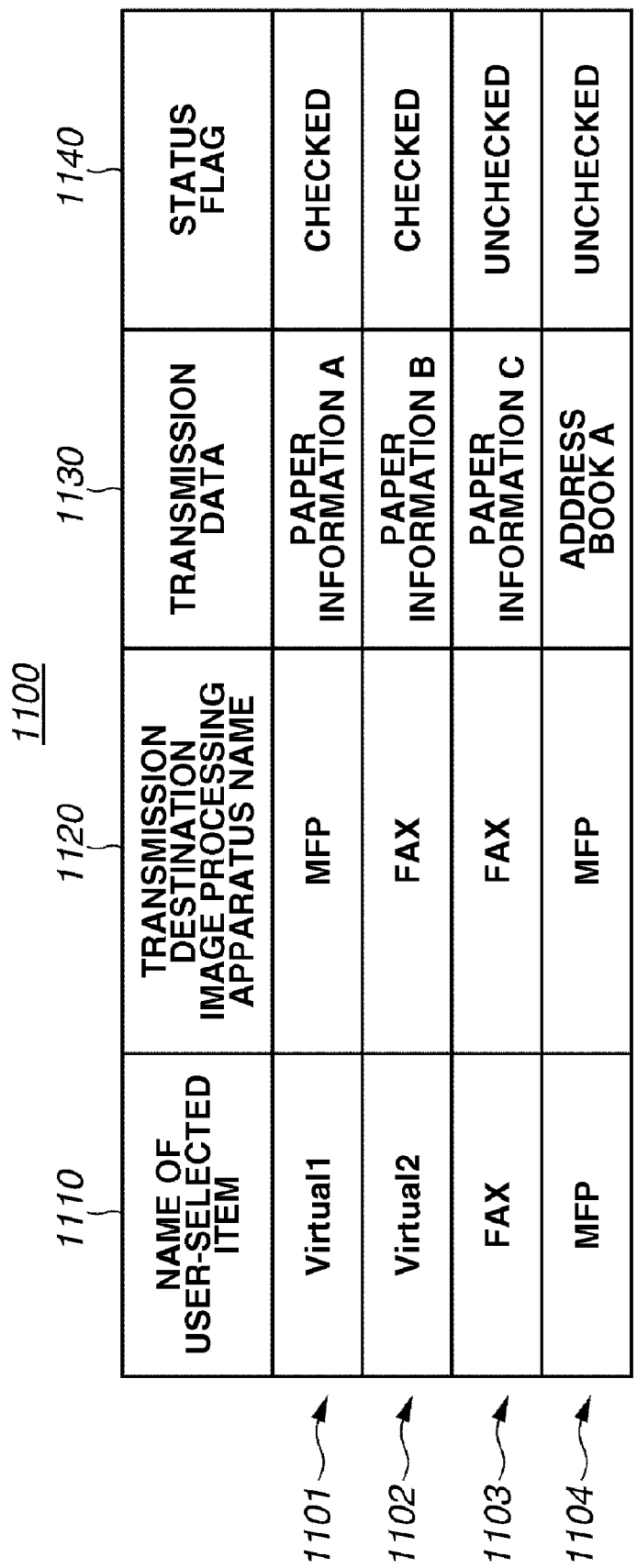
FIG. 11 illustrates an example of a device and transmission data table according to an exemplary embodiment of the present invention.

FIG. 11 illustrates an example of an image processing apparatus and transmission data table according to the present exemplary embodiment.

Referring to FIG. 11, an image processing apparatus and transmission data table 1100 is stored in the database 410 and is managed by the various-table storage function module 408. A user-selected item name 1110, a transmission destination image processing apparatus name 1120, transmission data 1130, and a status flag 1140 are associated with one another and registered in the image processing apparatus and transmission data table 1100.

In the transmission destination image processing apparatus name column 1120, a name of the image processing apparatus determined to be a transmission destination in step S709 is stored.

In the status flag column 1140, a status of each entry in the image processing apparatus and transmission data table 1100 is stored. More specifically, three statuses, namely, "unchecked", "checked", and "conflicting", can be set for the status flag 1140. The status flag 1140 is used in step S715 and beyond.

The status "unchecked" indicates that a determination whether the transmission data is conflicting has not been performed yet. The status "checked" indicates that the transmission data has been determined not to be conflicting as a result of a determination whether the transmission data is conflicting. The status "conflicting" indicates a status that is temporarily set in determining whether the transmission data is conflicting.

In the example illustrated in FIG. 11, the contents of entries 1101 through 1104 are not limited to those illustrated in FIG. 11. Furthermore, herein below, entries in the image processing apparatus and transmission data table 1100 are collectively referred to as an "image processing apparatus and transmission data set".

Referring back to FIG. 7, in step S711, the transmission destination image processing apparatus identification function module 403 increments the variable j by 1. Then, the processing returns to step S708.

If it is determined in step S708 that the value of the variable j is greater than Y (NO in step S708), then the processing advances to step S712. In step S712, the transmission destination image processing apparatus identification function module 403 increments the variable i by 1. Then, the processing returns to step S705.

If it is determined in step S705 that the value of the variable i is greater than X (NO in step S705), then the processing advances to step S713. In step S713, the transmission destination image processing apparatus identification function module 403 calculates the number of image processing apparatus and transmission data sets. Here, the calculated number of image processing apparatus and transmission data sets is taken as "Z" (Z is a natural number).

In step S714, the transmission destination image processing apparatus identification function module 403 initializes a variable k with a value "1".

In step S715, the transmission destination image processing apparatus identification function module 403 determines whether the value of the variable k is less than or equal to Z. If it is determined in step S715 that the value of the variable k is greater than Z (NO in step S715), then transmission destination image processing apparatus identification function module 403 determines that the processing in steps S716 through S718 has been performed for all of the image processing apparatus and transmission data sets, and accordingly, the transmission destination image processing apparatus identification function module 403 skips the processing in steps S716 through S718 and advances to step S719.

On the other hand, if it is determined in step S715 that the value of the variable k is less than or equal to Z (YES in step S715), then the processing advances to step S716. In step S716, the transmission destination image processing apparatus identification function module 403 determines whether the status (value) of the status flag 1140 for the k-th image processing apparatus and transmission data set is "checked".

If it is determined in step S716 that the status (value) of the status flag 1140 of the k-th image processing apparatus and transmission data set is "checked" (YES in step S716), then the transmission destination image processing apparatus identification function module 403 determines that it is not necessary to perform the processing of step S717, and accordingly, the transmission destination image processing apparatus identification function module 403 skips the processing of step S717 and advances to step S718.

On the other hand, if it is determined in step S716 that the status (value) of the status flag 1140 of the k-th image processing apparatus and transmission data set is not "checked" (NO in step S716), then the processing advances to step S717. In step S717, the conflicting device detection function module 404 and the device conflict coordination function module 405 perform conflict extraction and coordination processing for extracting transmission data whose transmission destination is conflicting and coordinating the extracted conflict. The conflict extraction and coordination processing is described in below with reference to FIG. 12.

In step S718, the transmission destination image processing apparatus identification function module 403 increments the variable k by 1. Then, the processing returns to step S715. If it is determined in step S715 that the value of the variable k is greater than Z (NO in step S715), then the processing advances to step S719.

In step S719, the data transmission task storage function module 406 generates a data transmission task and then stores the generated data transmission task in the database 410. Then, the processing of FIG. 7 ends. The data transmission task is described below with reference to FIG. 18.

The communication function module 409 sends the data transmission task stored in the database 410 as described above to the virtual device or the image processing apparatus that can be identified with an item name selected by the user via the item and transmission data selection screen 800. The destination of sending the data transmission task to be sent to the virtual device is the image processing apparatus registered in the image processing apparatus and transmission data table 1100.

Alternatively, it is also useful to send all or part of the transmission data selected by the user via the item and transmission data selection screen 800 at once or individually and separately. For example, the transmission data (in the example illustrated in FIG. 8, the paper information A and B) can be sent to a plurality of virtual devices (in the example illustrated in FIG. 8, the items "Virtual1" and "Virtual2") at once.

Figure 12B:
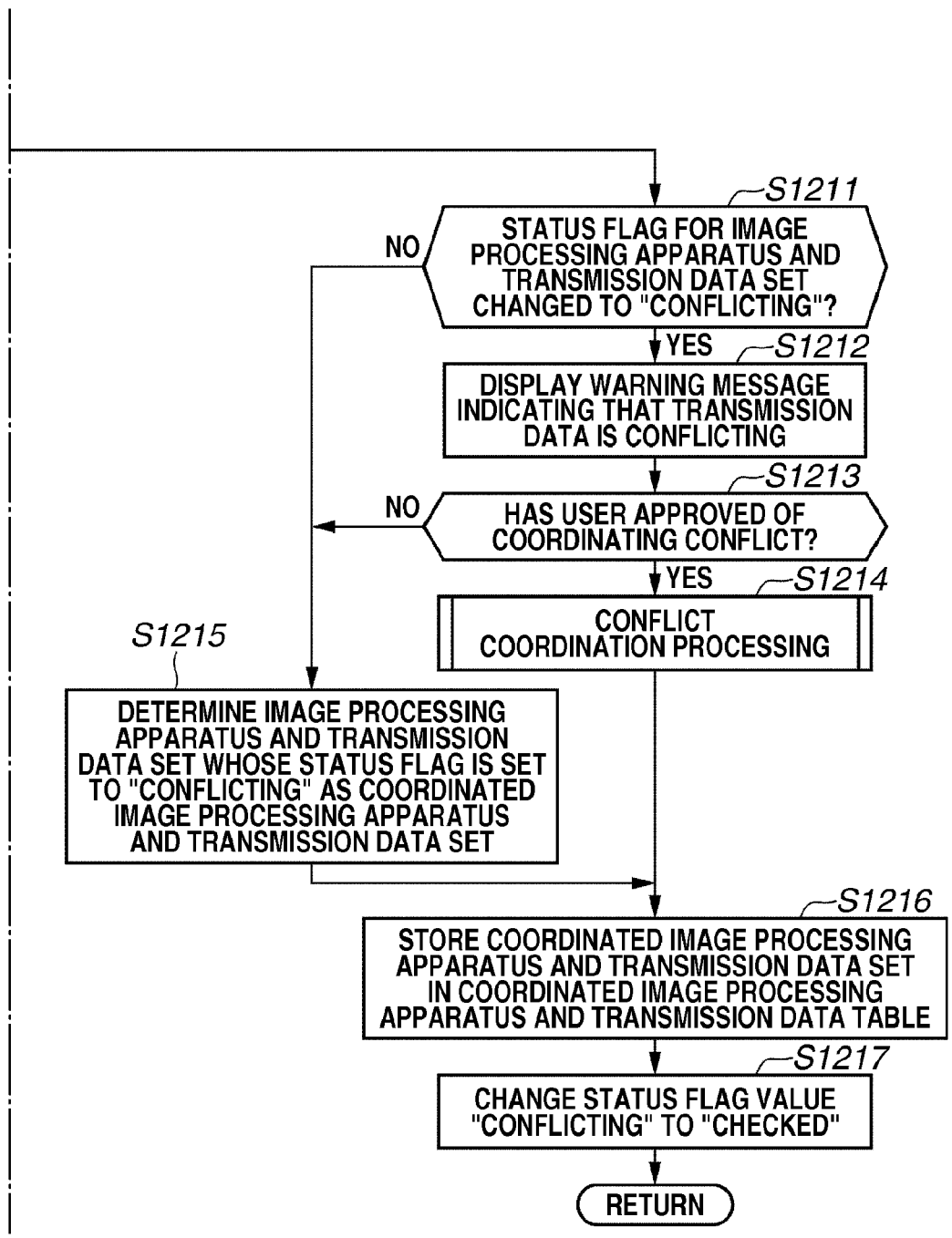
FIG. 12, which is composed of FIGS. 12A and 12B, is a flow chart illustrating a detail of conflict extraction and coordination processing according to an exemplary embodiment of the present invention.

Now, the conflict extraction and coordination processing of step S717 is described with reference to the flow chart of FIG. 12 (FIGS. 12A and 12B).

Referring to FIG. 12A, in step S1201, the conflicting device detection function module 404 sets the status (value) of the status flag 1140 for the k-th image processing apparatus and transmission data set to "conflicting".

In step S1202, the conflicting device detection function module 404 initializes a variable l by a value "(k+1)". In step S1203, the conflicting device detection function module 404 determines whether the value of the variable l is less than or equal to Z.

If it is determined in step S1203 that the value of the variable l is greater than Z (NO in step S1203), then the conflicting device detection function module 404 determines that the determination as to the conflict status has been performed on all of the image processing apparatus and transmission data sets, and accordingly, the conflicting device detection function module 404 skips the processing in steps S1204 through S1210 and the processing advances to step S1211 (FIG. 12B). On the other hand, if it is determined in step S1203 that the value of the variable l is less than or equal to Z (YES in step S1203), then the processing advances to step S1204.

In step S1204, the conflicting device detection function module 404 determines whether the status (value) of the status flag 1140 for the l-th image processing apparatus and transmission data set is "checked".

If it is determined in step S1204 that the status of the status flag 1140 for the l-th image processing apparatus and transmission data set is "checked" (YES in step S1204), then the conflicting device detection function module 404 skips the processing in steps S1205 through S1209 and the processing advances to step S1210. On the other hand, if it is determined in step S1204 that the status of the status flag 1140 for the l-th image processing apparatus and transmission data set is not "checked" (NO in step S1204), then the processing advances to step S1205.

In step S1205, the conflicting device detection function module 404 determines whether the transmission destination image processing apparatus name 1120 included in the k-th image processing apparatus and transmission data set and the transmission destination image processing apparatus name 1120 included in the l-th image processing apparatus and transmission data set match each other.

If it is determined in step S1205 that the transmission destination image processing apparatus name 1120 included in the k-th image processing apparatus and transmission data set and the transmission destination image processing apparatus name 1120 included in the l-th image processing apparatus and transmission data set do not match each other (NO in step S1205), then the conflicting device detection function module 404 skips the processing in steps S1206 through S1209 and the processing advances to step S1210. On the other hand, if it is determined in step S1205 that the transmission destination image processing apparatus name 1120 included in the k-th image processing apparatus and transmission data set and the transmission destination image processing apparatus name 1120 included in the l-th image processing apparatus and transmission data set match each other (YES in step S1205), then the processing advances to step S1206.

In step S1206, the conflicting device detection function module 404 determines whether the data ID 610 of the transmission data 600 described in the transmission data 1130 included in the k-th image processing apparatus and transmission data set and the data ID 610 of the transmission data 600 described in the transmission data 1130 included in the l-th image processing apparatus and transmission data set match each other.

If it is determined in step S1206 that the data ID 610 of the transmission data 600 described in the transmission data 1130 included in the k-th image processing apparatus and transmission data set and the data ID 610 of the transmission data 600 described in the transmission data 1130 included in the l-th image processing apparatus and transmission data set match each other (YES in step S1206), then the processing advances to step S1207. In step S1207, the conflicting device detection function module 404 changes the status (value) of the status flag 1140 for the l-th image processing apparatus and transmission data set to "checked". Then, the processing advances to step S1210.

On the other hand, if it is determined in step S1206 that the data ID 610 of the transmission data 600 described in the transmission data 1130 included in the k-th image processing apparatus and transmission data set and the data ID 610 of the transmission data 600 described in the transmission data 1130 included in the l-th image processing apparatus and transmission data set do not match each other (NO in step S1206), then the processing advances to step S1208.

In step S1208, the conflicting device detection function module 404 determines whether the data type 620 of the transmission data described in the transmission data 1130 included in the k-th image processing apparatus and transmission data set and the data type 620 of the transmission data described in the transmission data 1130 included in the l-th image processing apparatus and transmission data set match each other.

If it is determined in step S1208 that the data type 620 of the transmission data described in the transmission data 1130 included in the k-th image processing apparatus and transmission data set and the data type 620 of the transmission data described in the transmission data 1130 included in the l-th image processing apparatus and transmission data set do not match each other (NO in step S1208), then the conflicting device detection function module 404 skips the processing in step S1209 and advances to step S1210.

On the other hand, if it is determined in step S1208 that the data type 620 of the transmission data described in the transmission data 1130 included in the k-th image processing apparatus and transmission data set and the data type 620 of the transmission data described in the transmission data 1130 included in the l-th image processing apparatus and transmission data set match each other (YES in step S1208), then the conflicting device detection function module 404 determines that a plurality of transmission data is in a conflicting status (that is, the image processing apparatuses that perform the processing for a plurality of transmission data overlap), and accordingly, the processing advances to step S1209.

As described above, the present exemplary embodiment implements a determination unit by performing the processing in steps S1205, S1206, and S1208.

In step S1209, the conflicting device detection function module 404 changes the status (value) of the status flag 1140 for the l-th image processing apparatus and transmission data set to "conflicting". In step S1210, the conflicting device detection function module 404 increments the value of the variable l by 1. Then, the processing returns to step S1203.

If it is determined in step S1203 that the value of the variable l is greater than Z (NO in step S1203), then the processing advances to step S1211 (FIG. 12B).

In step S1211, the conflicting device detection function module 404 determines whether the status (value) of the status flag 1140 for the image processing apparatus and transmission data set has been changed to "conflicting". More specifically, in step S1211, the conflicting device detection function module 404 determines whether the processing in step S1209 has been performed at least once.

If it is determined in step S1211 that the status of the status flag 1140 for the image processing apparatus and transmission data set has never been changed to "conflicting" and that the processing in step S1209 has not been performed (NO in step S1211), then the conflicting device detection function module 404 determines that no conflicting transmission data exists, and accordingly, the processing advances to step S1215.

On the other hand, if it is determined in step S1211 that the status of the status flag 1140 for the image processing apparatus and transmission data set has been changed to "conflicting" and that the processing in step S1209 has been performed at least once (YES in step S1211), then the conflicting device detection function module 404 determines that conflicting transmission data exists, and according to the present exemplary embodiment, the processing advances to step S1212.

In step S1212, the device conflict coordination function module 405 displays a screen for warning the user that the transmission data to be transmitted to the same image processing apparatus is conflicting. As described above, the present exemplary embodiment implements a notification unit by performing the processing in step S1212.

In step S1213, the device conflict coordination function module 405 determines whether the IT administrator 420 has issued an instruction for coordinating the conflict via the screen displayed in step S1212.

If it is determined in step S1213 that the IT administrator 420 has issued an instruction for coordinating the conflict via the screen displayed in step S1212 (YES in step S1213), then the processing advances to step S1214. On the other hand, if it is determined in step S1213 that the IT administrator 420 has not issued an instruction for coordinating the conflict via the screen displayed in step S1212 (NO in step S1213), then the processing advances to step S1215.

Figure 13:
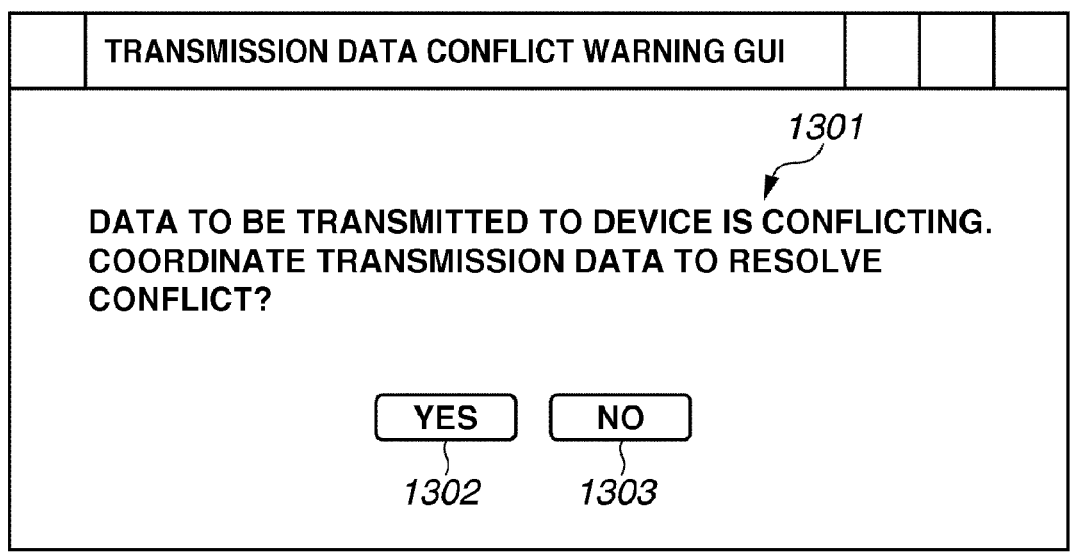
FIG. 13 illustrates an example of a transmission data conflict warning screen (GUI) according to an exemplary embodiment of the present invention.

FIG. 13 illustrates an example of a transmission data conflict warning screen (GUI) displayed in step S1212 according to the present exemplary embodiment.

Referring to FIG. 13, a warning message 1301 for notifying the IT administrator 420 that conflicting transmission data exists is displayed on a transmission data conflict warning screen 1300. Furthermore, on the transmission data conflict warning screen 1300, a "Yes" button 1302 and a "No" button 1303 are displayed. The "Yes" button 1302 can be operated by the user (the IT administrator 420) to issue an instruction for coordinating the conflict. The "No" button 1303 can be operated by the user (the IT administrator 420) to issue an instruction for not coordinating the conflict.

Referring back to FIG. 12, in step S1214, the device conflict coordination function module 405 performs conflict coordination processing for coordinating the transmission destination of the conflicting transmission data in the image processing apparatus and transmission data table 1100 using a data conflict coordination table 1400 illustrated in FIG. 14. The conflict coordination processing in step S1214 (FIG. 12) is described below with reference to the flow chart of FIG. 15.

A data type 1410 and a conflict coordination method 1420 are associated with each other and registered in a data conflict coordination table 1400 illustrated in FIG. 14. The data conflict coordination table 1400 is stored in the database 410 and is managed by the various-table storage function module 408.

In the data type column 1410, a value such as "address book", "paper information", "font", or "print function firmware" is stored. In the conflict coordination method column 1420, a most appropriate conflict coordination method for each data type 1410 is stored.

An entry 1401 is an example of an entry in the case where a value of the data type 1410 is "address book". For example, in the case of a corporation, a virtual device may be provided for each department or user. In this case, the address book may be frequently used by each department. Furthermore, each department may not want to allow a member of another department to view the address book. Accordingly, the address book cannot be merged or overwritten in the same storage area.

Therefore, in the present exemplary embodiment, data in a plurality of address books is managed within one image processing apparatus, for example, and the value of the conflict coordination method 1420 is set to "transmit to mutually different storage areas".

In this case, the image processing apparatus can use a storage area for the item "Virtual1" to store the data and thus can manage the data with respect to the corresponding virtual device. Thus, the management apparatus 101 can appropriately set the storage area that is a transmission destination according to a designation by the user.

It is useful to provide such a sub-regulation, like the conflict coordinating method 1420, so that if the capacity of the storage area in the transmission destination image processing apparatus is insufficient, the transmission data is not transmitted to the concerned storage area.

An entry 1402 is an example of an entry in the case where the value of the data type 1410 is "paper information". With respect to paper information, in any case, one piece of paper information is stored in one storage area of one image processing apparatus.

In this case, the paper information is overwritten every time the transmission data is transmitted to the storage area. Accordingly, the paper information whose transmission timing is the latest may be set as the latest paper information even in the case where the user has designated to transmit the transmission data at once. Therefore, in this case, it is necessary to transmit a result considering all transmission data to be transmitted at once.

Accordingly, in the present exemplary embodiment, the value of the conflict coordination method 1420 is set to "merge before transmission". Here, alternatively, it is useful to provide a sub-regulation so that the transmission data can be merged unless an arbitrarily set merging upper limit is not exceeded.

An entry 1403 is an example of an entry in the case where the value of the data type 1410 is "font". Here, the present exemplary embodiment presumes that one image processing apparatus can store as many types and amounts of fonts as the storage area can handle.

Accordingly, in this case, the value of the conflict coordination method 1420 is "do not coordinate". Here, it is useful to provide such a sub-regulation, like the conflict coordinating method 1420, so that if the capacity of the storage area in the transmission destination image processing apparatus is insufficient, the transmission data is not transmitted to the concerned storage area.

An entry 1404 is an example of an entry in the case where the value of the data type 1410 is "print function firmware". In an ordinary case, one print function firmware is stored in one image processing apparatus. Accordingly, in this case, the value of the conflict coordination method 1420 is "user selects and transmits one data". The content of the data conflict coordination table 1400 is previously registered in the database 410 according to an operation by the IT administrator 420.

Figure 15B:
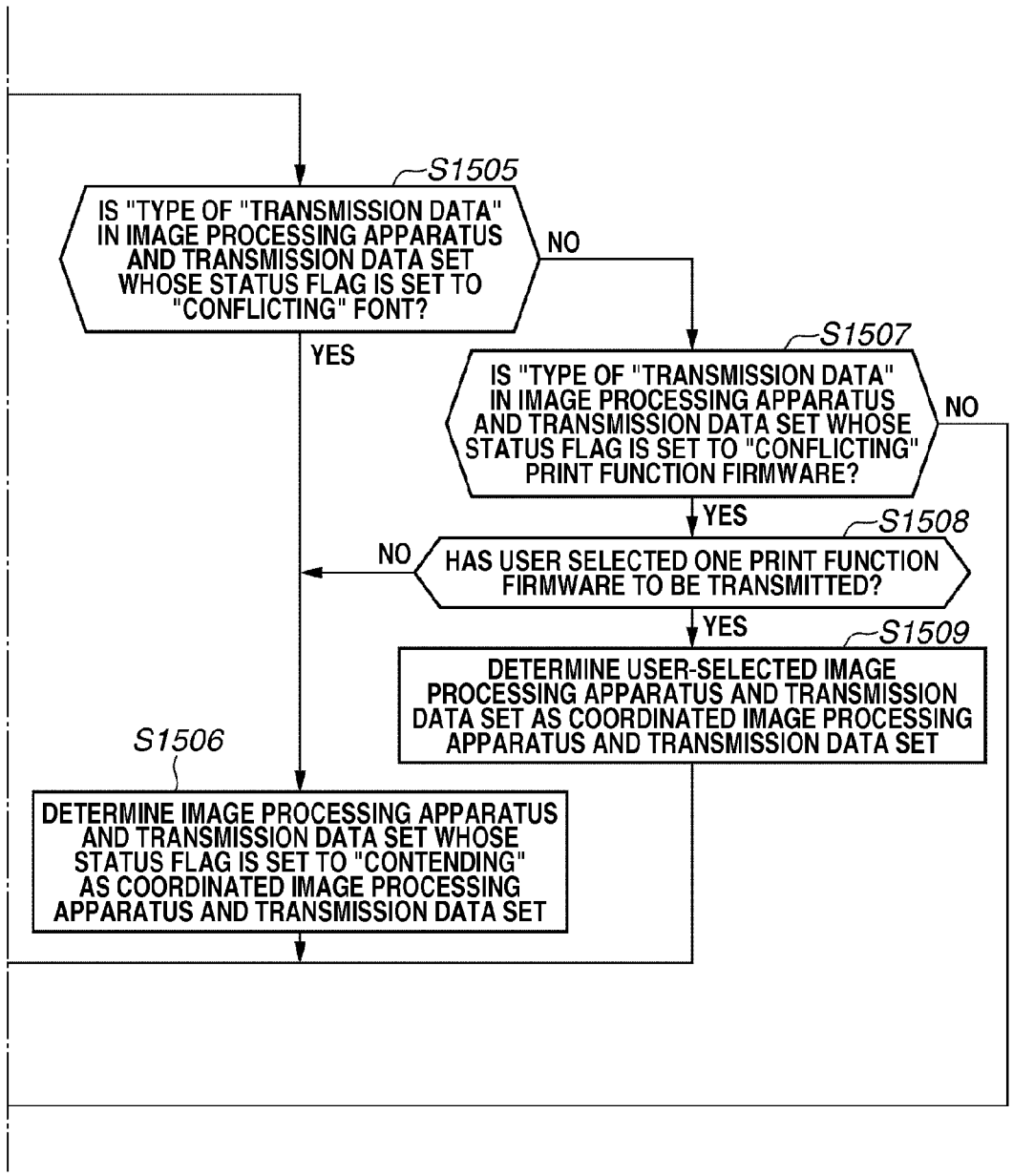
FIG. 15, which is composed of FIGS. 15A and 15B, is a flow chart illustrating a detail of conflict coordination processing according to an exemplary embodiment of the present invention.

Now, the conflict coordination processing in step S1214 (FIG. 12) will be described with reference to the flow chart of FIG. 15 (FIGS. 15A and 15B). Referring to FIG. 15A, in step S1501, the device conflict coordination function module 405 refers to a value of the transmission data 1130 described in the image processing apparatus and transmission data set whose status (value) of the status flag 1140 included in the image processing apparatus and transmission data table 1100 is "conflicting" to determine whether the value of the data type 620 described in the transmission data 1130 is "address book".

If it is determined in step S1501 that the value of the data type 620 described in the transmission data 1130 is not "address book" (NO in step S1501), then the processing advances to step S1503. On the other hand, if it is determined in step S1501 that the value of the data type 620 described in the transmission data 1130 is "address book" (YES in step S1501), then the processing advances to step S1502.

In step S1502, the device conflict coordination function module 405 performs processing for coordinating the conflict of the data of the address book using the data conflict coordination table 1400 (FIG. 14). More specifically, the device conflict coordination function module 405 newly generates an image processing apparatus and transmission data set whose value of the transmission area is changed so that the storage area provided within the image processing apparatus that is a transmission destination of transmitting the data for the address book can differ for each address book data. In this case, it is not necessary to set a status (value) of the status flag 1140. Then, the processing advances to step S1510.

On the other hand, in step S1503, the device conflict coordination function module 405 refers to a value of the transmission data 1130 described in the image processing apparatus and transmission data set whose status (value) of the status flag 1140 is "conflicting" to determine whether the value of the data type 620 described in the transmission data 1130 is "paper information".

If it is determined in step S1503 that the value of the data type 620 described in the transmission data 1130 is not "paper information" (NO in step S1503), then the processing advances to step S1505 (FIG. 15B). On the other hand, if it is determined in step S1503 that the value of the data type 620 described in the transmission data 1130 is "paper information" (YES in step S1503), then the processing advances to step S1504.

In step S1504, the device conflict coordination function module 405 performs processing for coordinating the conflict of data for the paper information using the data conflict coordination table 1400 (FIG. 14). More specifically, the device conflict coordination function module 405 merges (combines) the data for different paper information to newly generate one paper information data.

Then, the device conflict coordination function module 405 newly generates an image processing apparatus and transmission data set whose transmission data is the paper information data. In this case, it is not necessary to set a status (value) of the status flag 1140. Then, the processing advances to step S1510.

On the other hand, in step S1505, the device conflict coordination function module 405 refers to a value of the transmission data 1130 described in the image processing apparatus and transmission data set whose status (value) of the status flag 1140 is "conflicting" to determine whether the value of the data type 620 described in the transmission data 1130 is "font".

If it is determined in step S1505 that the value of the data type 620 described in the transmission data 1130 is not "font" (NO in step S1505), then the processing advances to step S1507. On the other hand, if it is determined in step S1505 that the value of the data type 620 described in the transmission data 1130 is "font" (YES in step S1505), then the processing advances to step S1506.

In step S1506, the device conflict coordination function module 405 performs processing for coordinating the conflict of the data of the font (font data) using the data conflict coordination table 1400 (FIG. 14).

If it is determined in step S1505 that the value of the data type 620 described in the transmission data 1130 is "font" (YES in step S1505), then the coordination processing is not performed and all of the fonts are transmitted to the image processing apparatus.

Accordingly, the device conflict coordination function module 405 newly generates an image processing apparatus and transmission data set in which the data for each font is the transmission data, for example. In this case, it is not necessary to set a status (value) of the status flag 1140. Then, the processing advances to step S1510.

In step S1507, the device conflict coordination function module 405 refers to a value of the transmission data 1130 described in the image processing apparatus and transmission data set whose status (value) of the status flag 1140 is "conflicting" to determine whether the value of the data type 620 described in the transmission data 1130 is "print function firmware".

If it is determined in step S1507 that the value of the data type 620 described in the transmission data 1130 is not "print function firmware" (NO in step S1507), then the device conflict coordination function module 405 determines that no coordination-target data exists, and accordingly, the device conflict coordination function module 405 ends the processing of the flow chart illustrated in FIG. 15. Then, the processing returns to step S1216 (FIG. 12). On the other hand, if it is determined in step S1507 that the value of the data type 620 described in the transmission data 1130 is "print function firmware" (YES in step S1507), then the processing advances to step S1508.

Figure 16:
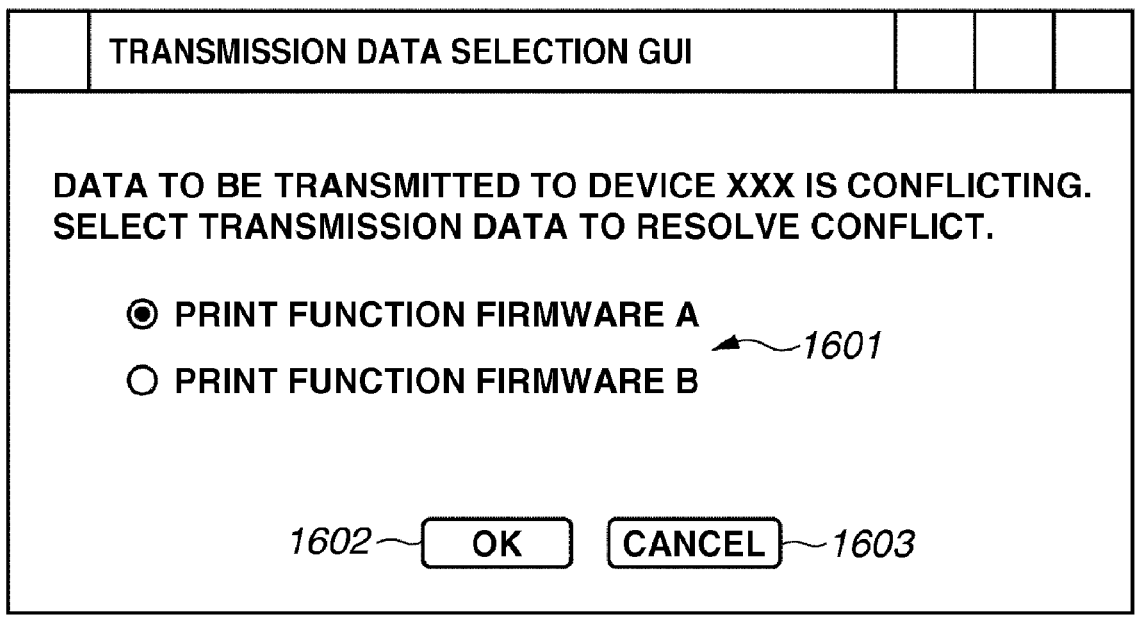
FIG. 16 illustrates an example of a transmission data selection screen (GUI) according to an exemplary embodiment of the present invention.

In step S1508, the device conflict coordination function module 405 performs processing for coordinating the conflict of the data for the print function firmware using the data conflict coordination table 1400 (FIG. 14). Here, the device coordination function module 405 determines whether the print function firmware to be transmitted has been selected by the IT administrator 420. More specifically, the device conflict coordination function module 405 displays a transmission data selection screen (GUI) 1600 according to the present exemplary embodiment as illustrated in FIG. 16.

On the transmission data selection screen (GUI) 1600, all information about the data for the print function firmware is displayed and provided to the IT administrator 420 to allow the IT administrator 420 to select one therefrom. A transmission candidate data list 1601, an "OK" button 1602, and a "cancel" button 1603 are displayed on the transmission data selection screen 1600.

The IT administrator 420 selects one radio button only corresponding to the printing function firmware to be transmitted from among "printing function firmware" displayed in the transmission candidate data list 1601. When the IT administrator 420 presses the "OK" button 1602, the device conflict coordination function module 405 inputs the entry by the IT administrator 420 via the transmission data selection screen 1600 (that is, the processing advances from step S1508 to step S1509).

When the IT administrator 420 presses the "cancel" button 1603, the device conflict coordination function module 405 cancels the input performed via the transmission data selection screen 1600 (that is, the processing advances from step S1508 to step S1506).

Returning to FIG. 15B, if it is determined in step S1508 that the print function firmware to be transmitted has not been selected by the IT administrator 420 (NO in step S1508), then the processing advances to step S1506. In step S1506, the device conflict coordination function module 405 uses the image processing apparatus and transmission data set whose status of the status flag is "conflicting" as the transmission data as it is.

On the other hand, if it is determined in step S1508 that the print function firmware to be transmitted has been selected by the IT administrator 420 (YES in step S1508), then the processing advances to step S1509. In step S1509, the device conflict coordination function module 405 newly generates an image processing apparatus and transmission data set in which the data for the print function firmware selected by the IT administrator 420 is set as the transmission data. In this case, it is not necessary to set a status (value) of the status flag 1140. Then, the processing advances to step S1510.

After the above-described processing is performed, in step S1510, the device conflict coordination function module 405 temporarily stores the image processing apparatus and transmission data set newly generated in step S1502, step S1504, step S1506, or step S1509 on a temporary storage device, such as the RAM 203 (FIG. 2).

Then, the processing of in FIG. 15 ends. The processing then returns to step S1216 of FIG. 12.

As described above, the present exemplary embodiment determines the transmission method according to the type of conflicting transmission data. More specifically, the present exemplary embodiment implements the transmission of the transmission data to the transmission destination image processing apparatus after coordinating the conflicting transmission data by performing the processing in step S1502, step S1504, or step S1509.

Referring back to FIG. 12, if it is determined in step S1211 that the status of the status flag 1140 for the image processing apparatus and transmission data set has never been changed to "conflicting" and that the processing in step S1209 has not been performed (NO in step S1211), the processing advances to step S1215.

In step S1215, the device conflict coordination function module 405 stores the image processing apparatus and transmission data set whose status (value) for the status flag 1140 is "conflicting" in a temporary storage area, such as the RAM 203, as a coordinated image processing apparatus and transmission data set. In this case, it is not necessary to store the status (value) OF the status flag 1140. Then, the processing advances to step S1216.

In step S1216, the device conflict coordination function module 405 stores the coordinated image processing apparatus and transmission data set that has been stored in the temporary storage device, such as the RAM 203, in step S1214 or step S1215 in the coordinated image processing apparatus and transmission data table.

FIG. 17 illustrates an example of a coordinated image processing apparatus and transmission data table according to the present exemplary embodiment.

Referring to FIG. 17, a coordinated image processing apparatus and transmission data table 1700 is stored in the database 410. Furthermore, the coordinated image processing apparatus and transmission data table 1700 is managed by the various-table storage function module 408. In the example illustrated in FIG. 17, a user-selected item name 1710, a transmission destination image processing apparatus name 1720, and transmission data 1730 are associated with one another and registered in the coordinated image processing apparatus and transmission data table 1700.

If a plurality of items has been combined in step S1214 (FIG. 12), then the names of the plurality of items are enumerated in the user-selected item name column 1710. An entry 1702 is an example of the enumerated names of the plurality of items.

In the transmission destination image processing apparatus name column 1720, a content similar to that stored in the transmission destination image processing apparatus name 1120 stored in the image processing apparatus and transmission data table 1100 is stored.

If the conflicting transmission data is coordinated by the processing in step S1214 (FIG. 12), then the transmission data obtained after its conflict has been coordinated is stored in the transmission data column 1730. In the example illustrated in FIG. 17, the contents of entries 1701 through 1703 are not limited to those illustrated in FIG. 17.

Referring back to FIG. 12, in step S1217, the device conflict coordination function module 405 changes the status (value) of the status flag 1140 for the image processing apparatus and transmission data set whose status (value) of the status flag 1140 is "conflicting" to "checked". After the above-described processing according to the flow chart of FIG. 12 has been performed, the processing advances to step S718 (FIG. 7).

Now, the data transmission task according to the present exemplary embodiment will be described. FIG. 18 illustrates an exemplary structure of a data transmission task according to the present exemplary embodiment.

Referring to FIG. 18, a data transmission task 1800 is constituted by adding task information to the coordinated image processing apparatus and transmission data table 1700

(FIG. 17). In the task ID 1810, an ID for identifying the data transmission task 1800 is stored. Here, any value with which the data transmission task 1800 can be uniquely identified can be used as the task ID 1810.

In a task name column 1820, a name of the data transmission task 1800 is stored. The task name 1820 can be set by either a user or the management apparatus 101.

In an image processing apparatus and transmission data set 1830, each entry in the coordinated image processing apparatus and transmission data table 1700 is stored. In a task generator user name column 1840, a name of the user who generated the data transmission task is stored.

In a task schedule column 1850, a schedule is stored according to which the data transmission task 1800 is executed at the date and time stored therein for transmitting the data to the image processing apparatus designated in the image processing apparatus and transmission data set 1830.

As described above, in the present exemplary embodiment, the type of the transmission data and the function executed as a virtual device by the image processing apparatus that constitutes the virtual device in performing a job are previously registered in the data transmission condition table 1000.

The IT administrator (user) 420 selects the transmission data and the virtual device that is the transmission destination of the transmission data via the item and transmission data selection screen 800.

Then, the management apparatus 101 identifies the image processing apparatus that executes the function related to the transmission data selected by the IT administrator (user) 420 from the selected virtual device. Then, the management apparatus 101 transmits the selected transmission data to the thus identified image processing apparatus as the transmission destination of the selected transmission data.

With the above-described configuration, the present exemplary embodiment allows the IT administrator (user) 420 to select a virtual device to select an image processing apparatus that performs processing on transmission data and to transmit the transmission data.

Furthermore, as described above, the present exemplary embodiment determines whether a plurality of transmission data whose transmission destination image processing apparatus is the same and whose transmission data type is the same exists within the transmission data selected by the IT administrator (user) 420 by referring to and using the image processing apparatus and transmission data table 1100.

If a plurality of transmission data satisfying the above-described determination condition exists and if the transmission destination of a plurality of transmission data contends, the present exemplary embodiment refers to and uses the data conflict coordination table 1400 to coordinate the transmission of the transmission data according to the type of the conflicting transmission data.

With the above-described configuration, the present exemplary embodiment can automatically coordinate the transmission of transmission data according to the type of the transmission data even if the transmission destination of a plurality of transmission data contends.

Other Exemplary Embodiments

In addition, each unit constituting the management apparatus and each step of the information processing method according to exemplary embodiments of the present invention can be implemented by executing a program stored in a RAM or a ROM of a computer. In this case, the program and a computer-readable recording medium (storage medium) storing the above-described program constitute the present invention.

The present invention can be implemented in a system, an apparatus, a method, a program, or a storage medium storing the program, for example. More specifically, the present invention can be applied to a system including a plurality of devices and to an apparatus that includes one device.

The present invention can be implemented by directly or remotely supplying a program of software implementing functions of the above-described exemplary embodiments (in the exemplary embodiments, the program corresponding to the processing performed according to the flow charts in FIGS. 7, 12, and 15) to a system or an apparatus and reading and executing supplied program code with a computer of the system or the apparatus.

Accordingly, the program code itself, which is installed on the computer for implementing the functional processing according to exemplary embodiments of the present invention with the computer, implements the present invention. That is, the present invention also includes a computer program for implementing the functional processing according to exemplary embodiments of the present invention.

Accordingly, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to exemplary embodiments of the present invention after an encryption thereof, by allowing a user who is qualified for a prescribed condition to download key information for decoding the encryption from the web site via the Internet, and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims priority from Japanese Patent Application No. 2007-218640 filed Aug. 24, 2007, which is hereby incorporated by reference herein in its entirety.

What is claimed is:

1. A management apparatus configured to manage a plurality of image processing apparatuses in communication with each other, the management apparatus comprising:
a management unit configured to, in order to provide processing performed by a virtual device to a user by cooperatively operating a plurality of image processing apparatuses constituting the virtual device, manage information associating each of the plurality of image processing apparatuses constituting the virtual device with a function executed by the each of the plurality of image processing apparatuses;
a control unit configured to provide a display for setting a virtual device as a transmission destination of transmission data;
an identification unit configured to, if a virtual device is set as the transmission destination of the transmission data, identify an image processing apparatus that executes a function corresponding to a type of the transmission data from among the plurality of image processing apparatuses constituting the set virtual device based on the information managed by the management unit;
a transmission unit configured to transmit the transmission data to the image processing apparatus identified by the identification unit;
a determination unit configured to, if a plurality of transmission destinations is set, determine whether a plurality of transmission data of a same type is transmitted by the transmission unit to one image processing apparatus; and
a designation unit configured to, if it is determined by the determination unit that a plurality of transmission data of a same type is transmitted to one image processing apparatus, designate a transmission method for transmitting the plurality of transmission data to the one image processing apparatus according to the type of the transmission data,
wherein the transmission unit transmits the transmission data according to the transmission method designated by the designation unit.

2. The management apparatus according to claim 1, wherein the control unit is further configured to provide a display for setting the image processing apparatus as the transmission destination of the transmission data,
wherein if the image processing apparatus is set as the transmission destination of the transmission data, the transmission unit transmits the transmission data to the image processing apparatus set as the transmission destination of the transmission data.

3. The management apparatus according to claim 1, further comprising a notification unit configured to, if it is determined by the determination unit that a plurality of transmission data of a same type is transmitted to one image processing apparatus, generate a notification indicating that the transmission data is conflicting.

4. The management apparatus according to claim 1, wherein the designation unit designates the transmission method for transmitting the transmission data such that the plurality of transmission data is stored in respective different storage areas of the image processing apparatus set as the transmission destination of the transmission data.

5. The management apparatus according to claim 1, wherein the designation unit designates the transmission method for transmitting the transmission data such that the plurality of transmission data is merged before being transmitted to the image processing apparatus set as the transmission destination of the transmission data.

6. The management apparatus according to claim 1, wherein the designation unit designates the transmission method for transmitting the transmission data such that only one transmission data designated by the user of the plurality of transmission data is transmitted.

7. A method for managing a plurality of image processing apparatuses in communication with each other, the method comprising:
managing information, in order to provide processing performed by a virtual device to a user by cooperatively operating a plurality of image processing apparatuses constituting the virtual device, associating each of the plurality of image processing apparatuses constituting the virtual device with a function executed by the each of the plurality of image processing apparatuses;
providing a display for setting a virtual device as a transmission destination of transmission data;
identifying, if a virtual device is set as the transmission destination of the transmission data, an image processing apparatus that executes a function corresponding to a type of the transmission data from among the plurality of image processing apparatuses constituting the set virtual device based on the managed information;
transmitting the transmission data to the identified image processing apparatus;
determining, if a plurality of transmission destinations is set, whether a plurality of transmission data of a same type is transmitted to one image processing apparatus; and
designating, if it is determined that a plurality of transmission data of a same type is transmitted to one image processing apparatus, a transmission method for transmitting the plurality of transmission data to the one image processing apparatus according to the type of the transmission data; and
transmitting the transmission data according to the designated transmission method.

8. The method according to claim 7, further comprising:
providing a display for setting the image processing apparatus as the transmission destination of the transmission data; and
transmitting, if the image processing apparatus is set as the transmission destination of the transmission data, the transmission data to the image processing apparatus set as the transmission destination of the transmission data.

9. The method according to claim 7, further comprising, generating, if it is determined that a plurality of transmission data of a same type is transmitted to one image processing apparatus, a notification indicating that the transmission data is conflicting.

10. The method according to claim 7, further comprising designating the transmission method for transmitting the transmission data such that the plurality of transmission data is stored in respective different storage areas of the image processing apparatus set as the transmission destination of the transmission data.

11. The method according to claim 7, further comprising designating the transmission method for transmitting the transmission data such that the plurality of transmission data is merged before being transmitted to the image processing apparatus set as the transmission destination of the transmission data.

12. The method according to claim 7, further comprising designating the transmission method for transmitting the transmission data such that only one transmission data designated by the user of the plurality of transmission data is transmitted.

13. A non-transitory computer-readable storage medium storing a computer-executable program for enabling a computer to perform the method of claim 7.

* * * * *